(12) United States Patent
Davids et al.

(10) Patent No.: US 9,740,079 B1
(45) Date of Patent: Aug. 22, 2017

(54) INTEGRATED OPTICAL TRANSCEIVER WITH ELECTRONICALLY CONTROLLED OPTICAL BEAMSTEERING

(71) Applicant: National Technology & Engineering Solutions of Sandia, LLC, Albuquerque, NM (US)

(72) Inventors: Paul Davids, Albuquerque, NM (US); Christopher DeRose, Albuquerque, NM (US); Anna Tauke-Pedretti, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/337,179

(22) Filed: Oct. 28, 2016

(51) Int. Cl.
| | |
|---|---|
| *G02B 6/12* | (2006.01) |
| *G02F 1/295* | (2006.01) |
| *H04B 10/40* | (2013.01) |
| *G02B 6/122* | (2006.01) |
| *G02B 6/134* | (2006.01) |
| *G02F 1/29* | (2006.01) |

(52) U.S. Cl.
CPC ......... *G02F 1/2955* (2013.01); *G02B 6/1226* (2013.01); *G02B 6/1347* (2013.01); *H04B 10/40* (2013.01); *G02B 2006/12188* (2013.01); *G02F 2001/291* (2013.01); *G02F 2203/24* (2013.01)

(58) Field of Classification Search
CPC .... G02F 1/292; G02F 1/2955; G02F 2203/24; G02F 2001/291; G02B 6/126; G02B 6/1226; G02B 6/1347; G02B 2006/12188; H04B 10/40
See application file for complete search history.

(56) References Cited

U.S. PATENT DOCUMENTS

| | | |
|---|---|---|
| 8,610,994 B1 | 12/2013 | Lentine et al. |
| 9,104,086 B1 | 8/2015 | Davids et al. |
| (Continued) | | |

OTHER PUBLICATIONS

Davids, P. et al., "Plasmonic Nanoantenna for On-chip Optical Phased Arrays", 2012, SAND2012-4623C.

(Continued)

*Primary Examiner* — Thomas A Hollweg
*Assistant Examiner* — Mary A El Shammaa
(74) *Attorney, Agent, or Firm* — Martin I. Finston

(57) ABSTRACT

A beam-steering optical transceiver is provided. The transceiver includes one or more modules, each comprising an antenna chip and a control chip bonded to the antenna chip. Each antenna chip has a feeder waveguide, a plurality of row waveguides that tap off from the feeder waveguide, and a plurality of metallic nanoantenna elements arranged in a two-dimensional array of rows and columns such that each row overlies one of the row waveguides. Each antenna chip also includes a plurality of independently addressable thermo-optical phase shifters, each configured to produce a thermo-optical phase shift in a respective row. Each antenna chip also has, for each row, a row-wise heating circuit configured to produce a respective thermo-optic phase shift at each nanoantenna element along its row. The control chip includes controllable current sources for the independently addressable thermo-optical phase shifters and the row-wise heating circuits.

14 Claims, 19 Drawing Sheets

(56) References Cited

U.S. PATENT DOCUMENTS

| | | | |
|---|---|---|---|
| 2012/0055013 A1* | 3/2012 | Finn | H01Q 1/2225 29/600 |
| 2012/0212383 A1* | 8/2012 | Sengupta | H01Q 9/04 343/742 |
| 2014/0192394 A1 | 7/2014 | Sun et al. | |

OTHER PUBLICATIONS

Davids, P. et al., "Plasmonic Nanoantenna for On-chip Optical Phased Arrays", 2012, SAND2012-0829C.

Davids, P. et al., "Plasmonic Nanoantenna for On-chip Optical Phased Arrays", 2012, SAND2012-1039C.

Derose, C. T. et al., "Electronically controlled optical beam-steering by an active phased array of metallic nanoantennas", 2013, Optics Express, pp. 5198-5203, vol. 21.

Derose, C. T. et al., "Ultracompact 45 GHz CMOS compatible Germanium waveguide photodiode with low dark current", 2011, Optics Express, pp. 24897-24904, vol. 25.

Doylend, J. K. et al., "Two-dimensional free-space beam teering with an optical phased array on silicon-on-insulator", 2011, Optics Express, pp. 21595-21604, vol. 19.

Martinez, N. J. D. et al., "High performance waveguide-coupled Ge-on-Si linear mode avalance photodiodes", 2016, Optics Express, pp. 19072-19081, vol. 24.

Peters, D. W. et al., "Nanoantenna-Enhanced Infrared Detectors for Improved Performance and Spectral Tunability", 2016, Sandia National Laboratories, SAND2016-6982C.

Peters, D. W. et al., Application of plasmonic subwavelength structuring to enhance infrared detection, 2014, Sandia National Laboratories, SAND2014-0850C.

Peters, D.W. et al., Application of plasmonic subwavelength structuring to enhance infrared detection, 2014, Sandia National Laboratories, SAND2014-0195C.

Peters, D. W. et al., "Nanoantenna-Enabled Midwave Infrared Detection", 2013, Sandia National Laboratories, SAND2013-3455C.

Peters, D. W. et al., "Nanoantenna-Enabled Midwave Infrared Focal Plane Arrays", 2012, Sandia National Laboratories, SAND2012-3197C.

Peters, D. W. et al., "Nanoantenna-Enabled Midwave Infrared Detection", 2013, Sandia National Laboratories, SAND22013-3539C.

Peters, D. W. et al., "Plasmonics and Nanoantennas for Infrared Detectors", 2013, Sandia National Laboratories, SAND2013-7483C.

Peters, D. W. et al., Plasmonics and Nanoantennas for Infrared Detectors, 2013, Sandia National Laboratories, SAND2013-3426C.

Sun, J. et al., "Large-scale nanophotonic phased array", 2013, Nature, pp. 195-199, vol. 493.

Van Acoleyen, K. et al., "Two-dimensional optical phased array antenna on silicon-on-insulator", 2010, Optics Express, pp. 13655-13660, vol. 18.

Hulme, J. C. et al., "Fully integrated hybrid silicon free-space beam steering source with 32 channel phased array", 2014, Proc SPIE, vol. 8989 898907-1-898907-15.

* cited by examiner

View A

View B

View C

View D

View E

View F

View G

View H

View I

View J

INTEGRATED OPTICAL TRANSCEIVER WITH ELECTRONICALLY CONTROLLED OPTICAL BEAMSTEERING

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

FIELD OF THE INVENTION

The invention relates to optical transceivers, and more particularly to transceivers that use steerable phased arrays for optical transmission and reception.

ART BACKGROUND

Systems for Light Detection and Ranging (LIDAR) are attracting a great deal of interest because of their numerous applications in fields such as autonomous vehicles, free-space communications, three-dimensional geographic information systems (3D GIS), and electronic imaging. Miniaturization of LIDAR components can potentially make LIDAR even more useful and further expand its range of applications. Integrated silicon photonics is one enabling technology for such miniaturization.

It was recently recognized that phased arrays implemented in silicon photonics technology can be used to steer optical beams, particularly infrared beams. In one approach, a grating diffracts an optical beam, wavelength tuning is used to steer the beam along one axis, and phase control is used to steer the beam along the orthogonal axis. Such an approach is described, for example, in the following publications: K. Van Acoleyen, H. Rogier, and R. Baets, "Two-dimensional optical phased array antenna on silicon-on-insulator," *Opt. Express* 18(13), 13655-13660 (2010); and J. K. Doylend, M. J. R. Heck, J. T. Bovington, J. D. Peters, L. A. Coldren, and J. E. Bowers, "Two-dimensional free-space beam steering with an optical phased array on silicon-on-insulator," *Opt. Express* 19(22), 21595-21604 (2011). Further, the use of thermo-optical tuning in a phased array of dielectric grating elements is described, e.g., in J. Sun, E. Timurdogan, A. Yaacobi, E. Shah Hosseini, D. Coolbaugh, and M. R. Watts, "Large-scale nanophotonic phased array," *Nature* (London), 493, 195-199 (2013).

In another approach, chip-scale silicon photonics technology is integrated with a metallic nanoantenna element array. An array of nanoantenna elements scaled for near-infrared emission are fed by silicon waveguides and subjected to individual thermo-optical phase control for steering a surface-normal beam. Such an approach is described, for example, in C. T. DeRose, R. D. Kekatpure, D. C. Trotter, A. Starbuck, J. R. Wendt, A. Yaacobi, M. R. Watts, U. Chettiar, N. Engheta, and P. S. Davids, "Electronically controlled optical beam-steeling by an active phased array of metallic nanoantenna elements," *Opt. Express* 21, 5198-5208 (2013), http://www.opticsinfobase.org/oe/abstract.cfm?URI=oe-21-4-5198, the entirety of which is hereby incorporated herein by reference.

The nanoantenna element array can in principle steer a beam over an extremely wide angle, approaching 180°, using waveguide thermo-optic heaters to control the individual phases of the respective nanoantenna elements. However, the pitch of the nanoantenna elements is limited by the presence of an individual phase-shifter for each of the nanoantenna elements. This limits the steering angle that can be achieved in practice.

An improvement is described in U.S. Pat. No. 9,104,086 (hereinafter, "the '086 patent"), commonly assigned herewith, which issued on Aug. 11, 2015 to Paul Davids et al. under the title, "Method and Apparatus of Wide-Angle Optical Beamsteering from a Nanoantenna Phased Array," the entirety of which is hereby incorporated herein by reference.

The above-cited U.S. Pat. No. 9,104,086 describes a chip-scale device in which the nanoantenna elements are arranged in a two-dimensional array of rows and columns. Within each row, the thermo-optical phase elements are treated in aggregate by heating them uniformly with a single controllable heating current. Thus each phase element can be implemented, for example, as a portion of a silicon waveguide that underlies a particular one of the nanoantenna elements. If, e.g., the nanoantenna elements are equally spaced relative to propagation length along the waveguide, then at any given uniform temperature there will be an equal phase shift between successive nanoantenna elements of the row.

The uniformly distributed phase shift is sufficient for steering the emissive plane of the row. A plurality of rows is arrayed along the column direction to provide steering in the orthogonal dimension. By eliminating the individual phase-shift elements in each row, the pitch limit can be overcome and nanoantenna element spacings can be achieved that make beam steering possible over a substantially greater range.

Still further refinements can lead to implementations that offer very wide apertures, multiple beams, and other useful features.

SUMMARY OF THE INVENTION

Accordingly, an embodiment of the invention in a first aspect is a beam-steering optical transceiver comprising one or more modules. Each module comprises an antenna chip and a control chip bonded to the antenna chip. Each antenna chip comprises a feeder waveguide, a plurality of row waveguides that tap off from the feeder waveguide, and a plurality of metallic nanoantenna elements arranged in a two-dimensional array of rows and columns such that each row overlies one of the row waveguides. Each antenna chip further comprises a plurality of independently addressable thermo-optical phase shifters, which we refer to as $2\pi$ phase shifters because a very large potential range of phase shifts is desirable. Each $2\pi$ phase shifter is configured to produce a thermo-optical phase shift in a respective row. Each antenna chip further comprises, for each row, a row-wise heating circuit configured to produce a respective thermo-optic phase shift at each nanoantenna element along its row.

For close spacing of the nanoantenna elements, each row-wise heating circuit advantageously comprises a single electric heating element arranged to heat, substantially uniformly, at least that portion of its row waveguide that directly underlies the corresponding row of nanoantenna elements.

The transceiver includes at least one coherent photodetector optically coupled to the feeder waveguide so that it is in receiving relationship with each of the metallic nanoantenna elements.

Each control chip includes a controllable current source for each $2\pi$ phase shifter and a controllable current source for each for each row-wise heating circuit on its corresponding antenna chip. For modules that include a photodetector, the control chip further includes a power supply circuit for the photodetector on its corresponding antenna chip, and it further includes a conditioning circuit connected so as to receive an output signal from the photodetector and configured to condition the output signal for transmission to a signal processor.

In embodiments, each antenna chip is bonded to its corresponding control chip through an interposer. Running through the interposer is a plurality of electrical connections between the antenna chip and the control chip.

In embodiments, the transceiver further comprises a light source optically coupled to the feeder waveguide on each of the one or more modules.

In embodiments, a signal processor is electrically coupled so as to receive output signals from a photodetector on each of the one or more modules. The output signals from the respective photodetectors are combined algorithmically.

In embodiments, the light source is a multi-wavelength source comprising a multiplexer configured to multiplex optical signals at multiple wavelengths onto the feeder waveguide.

In embodiments, the coherent photodetector on each antenna chip comprises at least one balanced homodyne or heterodyne detector. In some embodiments, the coherent photodetector on each antenna chip comprises a plurality of balanced homodyne or heterodyne detectors, each of the balanced detectors comprises a respective local oscillator, and each respective local oscillator is tuned or tunable to provide an optical reference signal at a different wavelength.

In embodiments, each antenna chip includes a semiconductor optical amplifier having an optical propagation path that is coaxial with the feeder waveguide.

In embodiments, the antenna chip has a front side and a back side, the array of metallic nanoantenna elements is on the front side, the back side is proximal the interposer, the antenna chip contains a ground plane situated intermediate the front and back sides, the antenna chip further comprises vertical interconnects for routing electric power from the interposer through the back side to the row-wise heating circuits and the $2\pi$ phase shifters, and the antenna chip further comprises vertical interconnects for routing electric power from the interposer through the back side to the coherent photodetector and for routing output signals from the coherent photodetector through the back side to the interposer.

In embodiments, the transceiver comprises a plurality of modules of the kind described above and a signal processor configured to send control signals to all of the modules.

In embodiments, the transceiver comprises a compact arrangement of four or more modules of the kind described above. By "compact" is meant that the total area of the metallic nanoantenna element arrays is at least 80% the area of a minimal convex polygon enclosing the arrangement of modules.

In embodiments, the optical routing within the antenna chip is apportioned between a crystalline silicon layer and a polysilicon layer that lies between the crystalline silicon layer and the array of metallic nanoantenna elements.

In a second aspect, the invention relates to a method for making an optical transceiver. In an embodiment, the method comprises providing an SOI wafer having an active silicon layer, a buried oxide (BOX) layer, and a silicon handle layer. Waveguiding features are defined in the active silicon layer and ion implantation is performed to define resistive heater portions in the active silicon layer. In some embodiments, a photodetector is fabricated in the active silicon layer. A CVD oxide layer is formed over the active silicon layer. Vias are formed in the CVD oxide layer. A metal film is deposited over the CVD oxide and patterned to define contact pads.

The contact pads are brought into contact with a silicon interposer and the SOI wafer is bonded to the interposer.

The handle wafer is removed by grinding. The BOX is polished flat. A metal layer is deposited on the BOX and patterned to form an array of metallic nanoantenna elements. A protective oxide layer is formed over the array of metallic nanoantenna elements.

In embodiments, a metallic ground plane is formed over the CVD oxide layer that covers the active silicon layer, a further CVD oxide layer is formed over the metallic ground plane, and the metal film for patterning to define the contact pads is deposited over the further CVD oxide layer.

BRIEF DESCRIPTION OF THE DRAWINGS

FIG. 1 is a plan view and FIG. 2 is an exploded, perspective view of a detail of FIG. 1. The scales of both figures have been greatly exaggerated for ease of presentation. Features common to both figures have been designated by like reference numerals.

DETAILED DESCRIPTION

U.S. Pat. No. 9,104,086, cited above, describes an arrangement of beam-steering elements that is also useful in the context of the present invention. Accordingly, the following description, although it is not limited to the disclosures of the U.S. Pat. No. 9,104,086, draws on portions of the description found in that document, which may be consulted for further information.

Figure 1:
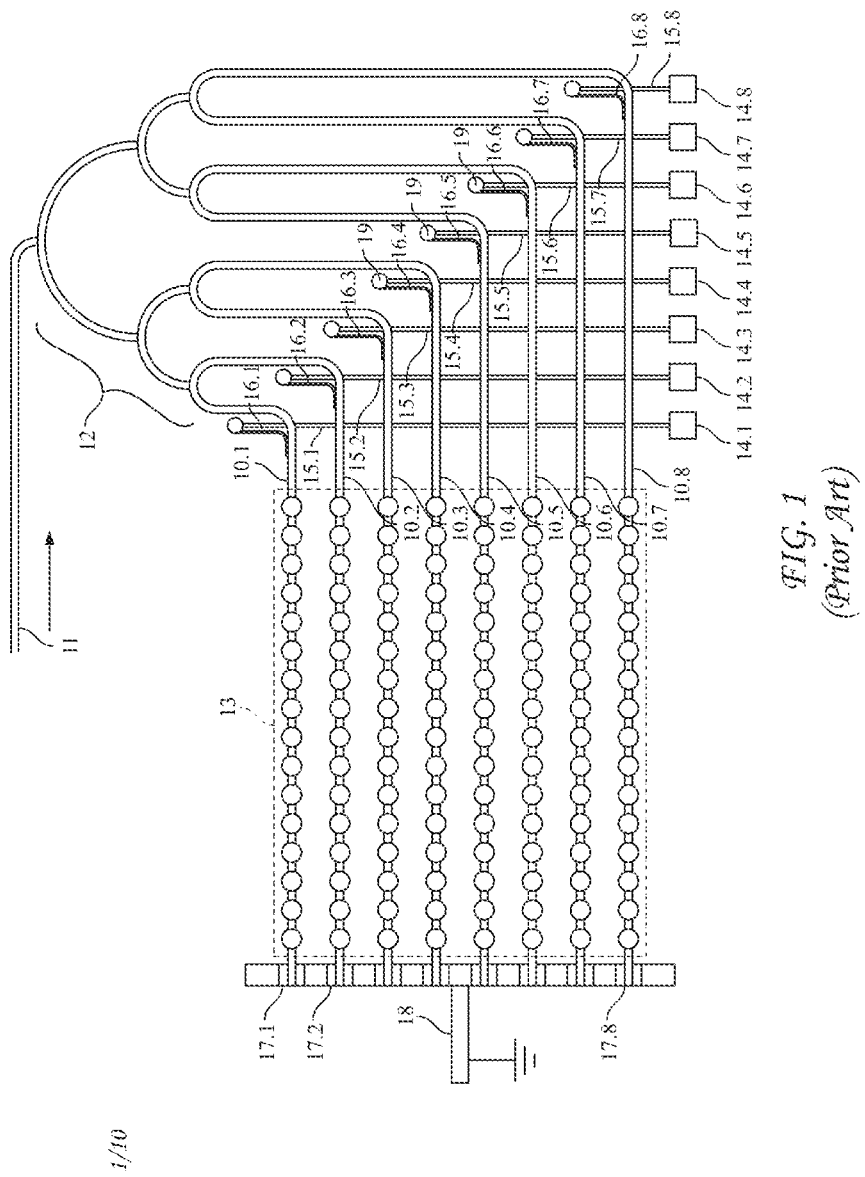
FIGS. 1 and 2 provide schematic views of a beamforming nanoantenna array of the prior art.
Figure 2:
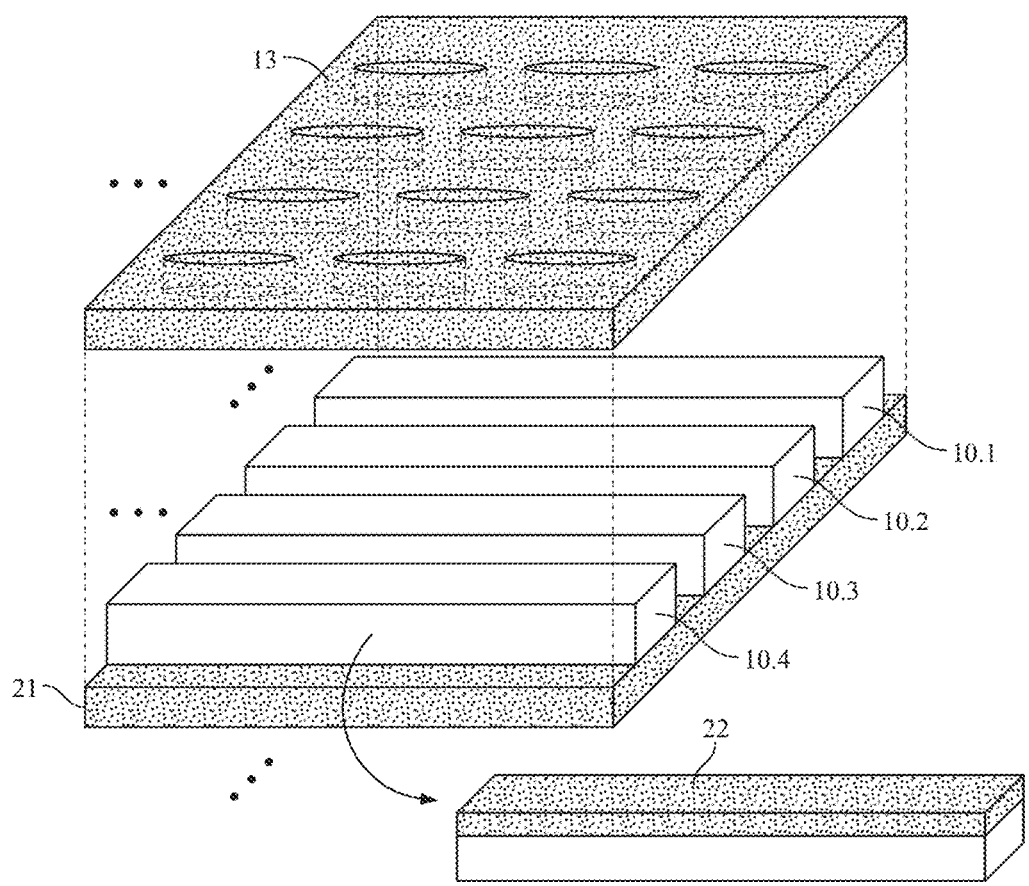

FIGS. 1 and 2 provide schematic views of an example beam-steering arrangement. FIG. 1 is a plan view and FIG. 2 is an exploded, perspective view of a detail of FIG. 1. The scales of both figures have been greatly exaggerated for ease of presentation. Features common to both figures have been designated by like reference numerals.

As seen in the figures, a parallel array of silicon waveguides 10.1, 10.2, . . . , 10.N is formed on a surface of substrate 21. The number N in the illustration is 8, but it will be understood that the choice of eight waveguides per array is exemplary and not limiting.

The waveguides are fed an optical signal input that enters on optical fiber 11, or on an alternative type of optical waveguide. The input signal is subdivided and fed to the respective waveguides 10.1, 10.2, etc., by 1×N optical splitting arrangement 12. As will be seen, the illustrative splitting arrangement is a cascading sequence of 1×2 splitter stages fabricated as silicon waveguides. However, this is offered merely as an example and is not limiting.

Each of the N waveguides is overlain by a linear array of nanoantenna elements to which it is coupled by plasmonic coupling. In the illustration, there are sixteen nanoantenna elements in each linear array so that a single emissive unit provides an 8×16 array of elements. It will of course be understood that the specific example of an 8×16 array is merely exemplary.

In the present example, each of the nanoantenna elements is defined as a circular hole formed in a continuous metallic film 13 that overlies the waveguides. Those skilled in the art will understand that numerous variations may be substituted, including films with perforations of different shapes, as well as metallization patterns that consist of arrays of separated metal shapes instead of perforations. Although the present example uses perforations of a uniform size, it will also be understood that apodization techniques may in at least some cases be advantageously employed. In such techniques, the size or shape of the hole (or of, in other implementations, the discrete metal shape) is varied across the array for the purpose of shaping the emitted beam.

With further reference to FIGS. 1 and 2, it will be seen that each of waveguides 10.1-10.N is electrically connected by way of respective members 16.1-16.N that serve as optically non-perturbing electrical contacts, and by respective traces 15.1-15.N to a respective contact pad 14.1-14.N. Each of the optically non-perturbing contact members is a silicon channel that merges with a respective one of the waveguides. To minimize optical scattering, it is desirable for each contact member to have about the same cross-section as its corresponding waveguide and to curve so that it merges continuously with the waveguide along a tangent.

Signal-level electrical contact is made from each of traces 15.1-15.N to its respective one of contact members 16.1-16.N by way of a respective via 19. The vias can provide vertical interconnections to contact pads either on the front side of the device (i.e., on the side proximal the nanoantenna elements), or on the back side (i.e., the side opposing the nanoantenna elements). However, as will be seen below, it is currently preferred to use back-side contacts in order to minimize the amount of structure that could otherwise occlude the aperture of the device.

Each of the waveguides includes an upper portion 22 that has gained sufficient electrical conductivity, through ion implantation, for it to serve as a resistor for ohmic heating of that waveguide when suitably energized. The heating currents flow from the above-described contact pads, traces, and lead-ins, through the respective waveguides, and into ground by way of connections 17.1-17.N and ground connection 18. As illustrated, connections 17.1-17.N are connections to a common bus that is grounded through ground connection 18. In alternative arrangements, each of connections 17.1-17.N is individually grounded through, e.g., a respective ground connection similar to ground connection 18.

In operation, the heating current in each waveguide flows in a direction parallel to the optical propagation direction. The result is that each waveguide is heated to a temperature that is substantially uniform in that waveguide. The heating current in each waveguide is controllable independently of any of the other waveguides by applying independently selectable voltages to the respective contact pads 14.1-14.N. Thus, in particular, it is possible by appropriate selection of the heating currents to create any of various desired temperature gradients in the array, wherein the gradient direction is transverse to the optical propagation direction.

Figure 3A:
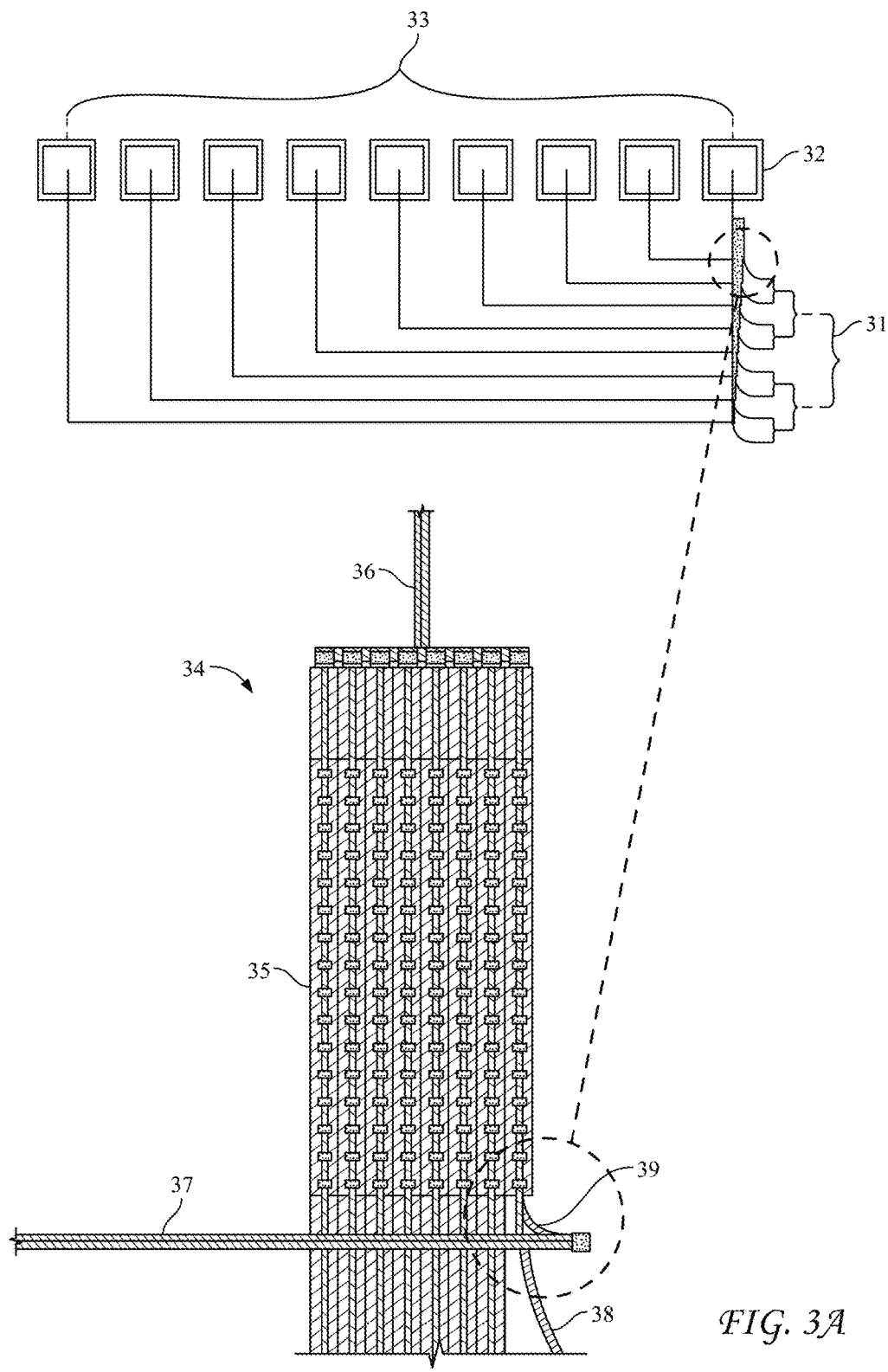
FIG. 3A provides a plan view, approximately to scale, of a portion of an exemplary layout for a device as represented schematically in FIGS. 1 and 2.

FIG. 3A provides a plan view, approximately to scale, of a portion of a beam-steering device as described above. Visible in the main portion of the figure are optical splitter 31, ground contact pad 32 for the heater currents, and linear array 33 of signal-level contact pads for the heater currents. More clearly visible in the detail 34 of FIG. 3 are nanoantenna element film 35, electrical connection 36 from the common grounding bus to the ground contact pad 32, and a representative signal-level trace 37, corresponding to silicon waveguide 38. As seen in the figure, trace 37 makes contact, through a via, to optically non-perturbing contact member 39, which in turn makes electrical contact to waveguide 38.

As is well known, silicon exhibits a relatively large thermo-optic coefficient. As a consequence, each nanoantenna element along a given waveguide can be given a respective phase within in the cyclic interval $(0, 2\pi)$ radians that is proportional to the waveguide temperature T and to the total optical propagation distance from a reference point within the waveguide. For example, if the elements along a given waveguide are uniformly spaced with a lattice constant $\Delta x$ and are sequentially numbered from the input end according to n=0, 1, 2, etc., then (relative to element 0) each phase $\phi_n$ will satisfy the relation, $\phi_n \propto n \cdot T \cdot \Delta x$.

As is well known from the theory of diffraction, the emission pattern, or beam, from a linear array of small emissive elements typically exhibits a main central lobe and two or more subsidiary side lobes. A geometrical plane is defined by the array axis and the principle direction of optical emission from the respective elements. We refer to rotation in that plane as "polar" rotation. By controlling the relative phases of the elements in the linear array, it is possible to steer the beam in the polar direction. The range of beam directions that are achievable is generally limited by the angular spacing between the central lobe and the first side lobe on each side of the central lobe. This angular spacing, in turn, is dependent on the lattice constant of the array. In general, the smaller the lattice constant, the greater the angular distance between the central lobe and the side lobes.

Although the array geometry determines the phase differences between successive elements at each given temperature, the size of those phase differences can be controlled by controlling the temperature. This provides sufficient control to steer the beam within any range between $\theta=-\pi/2$ and $\theta=\pi/2$ that is permitted by the side lobes and by practical design constraints.

By way of example, we confirmed in experimental trials that at a temperature of 450° C., which is reasonable for silicon, a change $\Delta n$ in the effective refractive index of the silicon waveguides of about 0.08 could be produced by thermo-optical tuning. At a spatial period of 3.8 µm in the x-direction, this enabled the nanoantenna array to steer a beam by 16°. For large-angle steering in the y-direction, a sub-wavelength period is desirable.

A two-dimensional array of elements can provide even more control over the beam direction. Rotations in the plane of the two-dimensional array are referred to herein as "azimuthal" rotations. As is well known to those skilled in the art, appropriate control of the respective phases of the elements in a two-dimensional array can lead to joint steering of the beam in the polar and azimuthal directions.

In the U.S. Pat. No. 9,104,086, we explained that phase control effective for joint steering in the polar and azimuthal directions can be achieved by individually controlling the (substantially uniform) temperatures of the respective waveguides. In fact, given any bearing, i.e. any combination ($\theta$, $\psi$) of respective polar and azimuthal angles within the scanning range, it is possible to find at least one set of temperatures for the respective waveguides that will direct the beam in the given bearing direction. In practice, the required temperature settings can be found numerically by simulating the diffractive behavior of the array and searching over the parameter space for an effective combination of temperature settings. Various algorithms useful for such a purpose are available and need not be described here in detail.

We have also recognized that further control for steering of the beam over a solid angle potentially as large as $2\pi$ steradians (i.e., an entire hemisphere) can be provided by adding an independently addressable phase shifter, exemplarily a thermo-optical phase shifter, to each respective row of the array. Such phase shifters are advantageous because they simplify the problem of joint polar and azimuthal steering, relative to implementations in which steering is done solely using the row-wise heaters.

Various suitable designs for the independently addressable phase shifters are known in the art. One example is provided in C. T. DeRose et al., "Electronically controlled optical beam-steering by an active phased array of metallic nanoantennas," *Optics Express* 21, 4 (2013) 5198-5208 (hereinafter "DeRose 2013"), the entirety of which is hereby incorporated herein by reference. Another example is provided in U.S. Pat. No. 8,610,994 (hereinafter "the '994 patent"), which issued to Anthony L. Lentine et al. on Dec. 17, 2013, which is commonly owned herewith, and the entirety of which is hereby incorporated herein by reference.

Briefly, DeRose 2013 describes ohmic thermo-optic phase shifters fabricated in silicon and having a serpentine shape to increase the effective path length. The '994 patent describes an alternate approach in which the phase shift is produced by overcoupling a waveguide to an optical microresonator. To vary the phase shift, the microresonator may be tuned thermo-optically or by carrier injection.

We refer to the independently addressable phase shifters as "$2\pi$" phase shifters because their maximum advantage is realized when a full range of possible phase shifts, modulo $2\pi$, is available at the input to each row of nanoantenna elements.

Accordingly, each row is resistively heated to provide thermo-optically steering in the row-wise propagation direction (which by convention we refer to as the x-direction) by accumulating the thermo-optical propagation phase along the row. Concurrently, the beam-steering in the column-wise direction (which by convention we refer to as the y-direction) is produced by the individual 2-$\pi$ phase shifters on the respective waveguide-fed rows. It should be noted in this regard that that the nanoantenna array will typically be embedded in an overcoating of a transparent dielectric material such as silicon dioxide. Because the dielectric has a greater refractive index than air, its presence will increase the steering angles produced by given heating currents, relative to what would be produced using a direct metal-to-air interface.

Figure 3B:
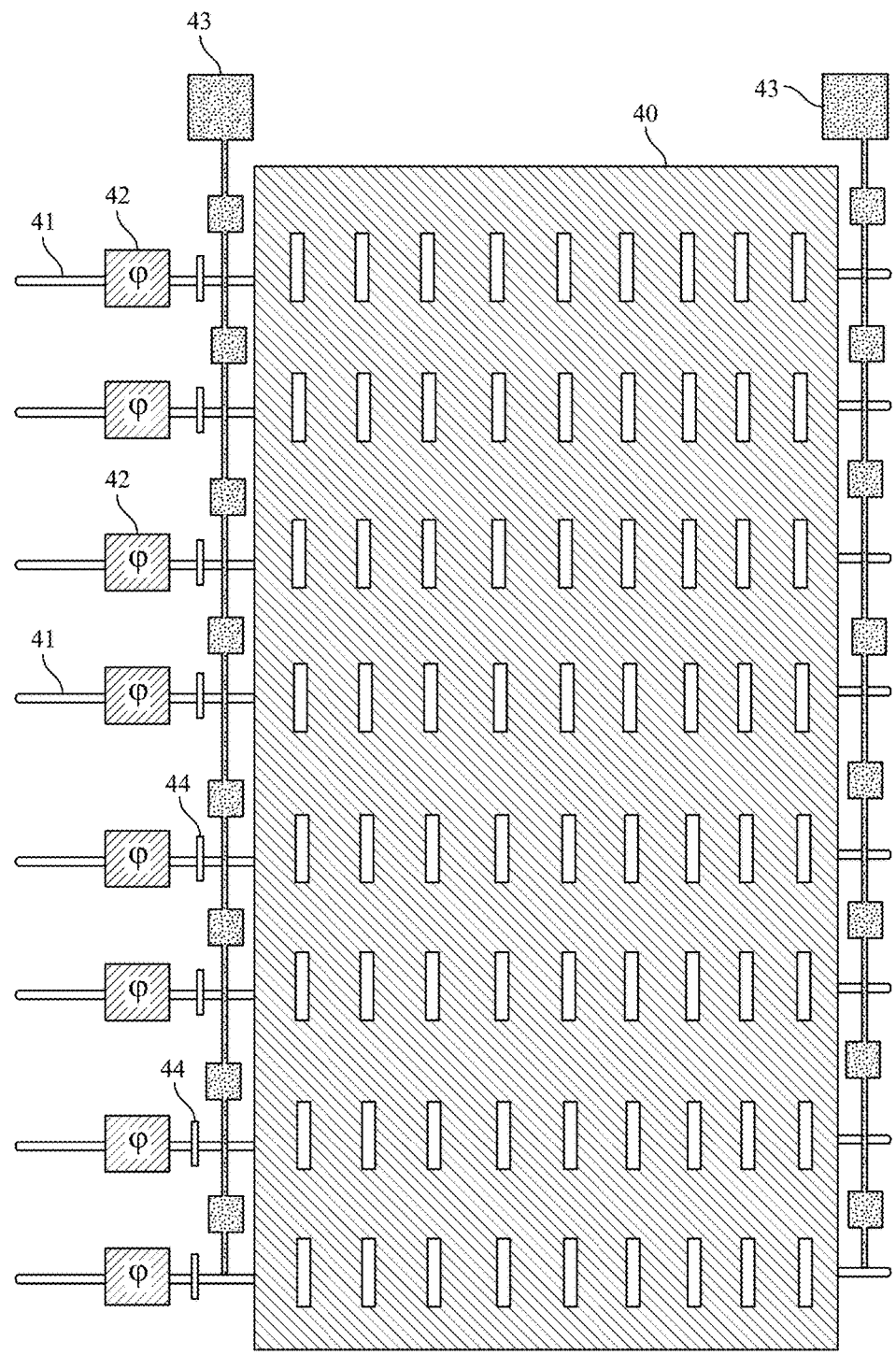
FIG. 3B provides a notional plan view of a portion of a beam-steering device that uses individually addressable phase-shifters for greater steering control.

FIG. 3B provides a notional plan view of a portion of a beam-steering device that uses $2\pi$ phase shifters together with row-wise heaters to control combined polar and azimuthal steering. As seen in the figure, a nanoantenna array 40 is fed by row waveguides 41. A $2\pi$ phase shifter 42 is placed in the path of each row waveguide. Electric power for the row-wise heaters is provided by circuit 43. As represented in the figure, all of the row-wise heaters are powered in parallel. This is meant to indicate that in operation, all of the rows together will typically have the same controlled temperature, so that (at a given temperature) all of the rows together sustain the same gradient in phase along the horizontal direction (i.e. along the direction along which each row extends).

Also indicated in FIG. 3B are thermally blocking features 44, which are respectively interposed between each row-wise heater and the $2\pi$ phase shifter for that row to suppress thermal crosstalk between them. Silicon nitride is useful for thermal blocking because it has a much lower thermal conductivity than silicon (at non-cryogenic temperatures). Accordingly, one example thermally blocking feature can be made by transitioning from a silicon waveguide to a silicon nitride waveguide, and then back to silicon in a linear sequence. Because of differences in refractive index, the silicon nitride waveguide is typically wider than the silicon waveguide in one or more dimensions transverse to the propagation direction. Hence in one convenient configuration, the entering and exiting silicon waveguide portions both taper adiabatically within a surrounding body of silicon nitride.

Figure 4:
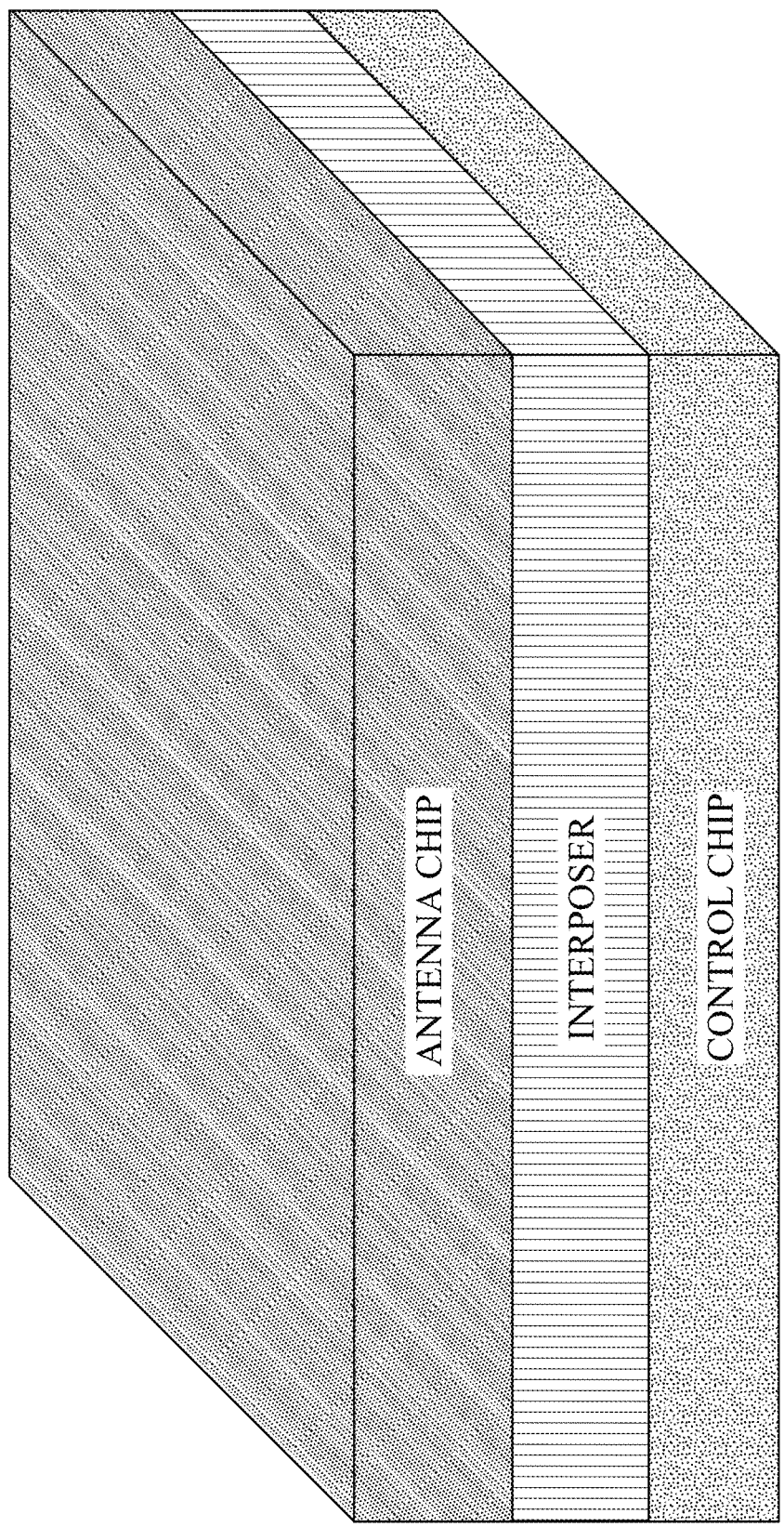
FIG. 4 is a highly simplified perspective view illustrating the layered construction of a transceiver module according to an embodiment of the invention described here.

We turn now, with reference to FIG. 4, to various further advances we have made over the embodiments disclosed in U.S. Pat. No. 9,104,086. FIG. 4 notionally illustrates an example embodiment of one beam steering module according to the principles described here. As seen, the module includes an antenna chip, an interposer, and a control chip. The antenna chip includes the array of nanoantenna elements and the thermo-optical components as described above. As will be seen, the antenna chip can also include a photodetector and it can include an optical amplifier for signals that are to be transmitted. The control chip includes current sources for the heating circuits of the thermo-optical components and power sources for the photodetector and optical amplifier, if these components are included. The control chip can also include circuitry for conditioning the output from the photodetector for transmission to a remote signal processor. The control chip will also typically include circuitry for converting digital control signals received from a remote signal processor into appropriate analog current levels for the thermo-optical components.

One of the advantages of our design is that all of the electrical contacts for connection to circuitry external to the antenna chip can be placed on the back side of the antenna chip. This helps to minimize the amount of geometrical overhead on the front side, i.e., the amount of front-side area that is used for purposes other than the nanoantenna array. It is especially advantageous to minimize the overhead when a plurality of modules are tiled together to form a composite array. The aperture of such a composite arrangement is defined by combining the outputs of the individual modules (which in that case correspond to respective sub-apertures).

Another advantage is improved thermal management, because the thermal load from the phase shifters is readily passed through metal contact pads to the interposer, which provides a thermal sink.

If a plurality of tiled sub-apertures are used, their outputs will typically be combined optically and directed to a photodetector. Alternatively, the electrical outputs from respective photodetectors situated on the individual sub-aperture modules can be combined algorithmically, using both phase and amplitude information obtained by coherent detection.

Generally, the more seamlessly the individual sub-apertures can be tiled together, the better will be the beam quality of the composite aperture. Every front-surface feature that constitutes overhead will partially occlude the aperture, and in consequence it might reduce the beam quality.

The interposer 42 facilitates the placement of electrical contacts on the back side of the antenna chip 41. A typical interposer for this purpose is a silicon wafer in which an array of through-silicon vias makes vertical electrical connections between arrays of contact pads on the opposing faces of the interposer. Thus by including the interposer, geometrical overhead can be reduced and an improved beam quality can be achieved.

When an interposer includes through-silicon vias (TSVs), the aspect ratio of the TSVs can limit the maximum feasible pin count on the back side of the antenna chip. In an example, the silicon interposer layer is 300 μm thick and contains TSVs having an aspect ratio (length divided by diameter) of 15:1. That would allow 20-μm pads at a 40-μm pitch, so that a one-millimeter square can be filled with a dense array of 625 electrical contacts.

Figure 5:
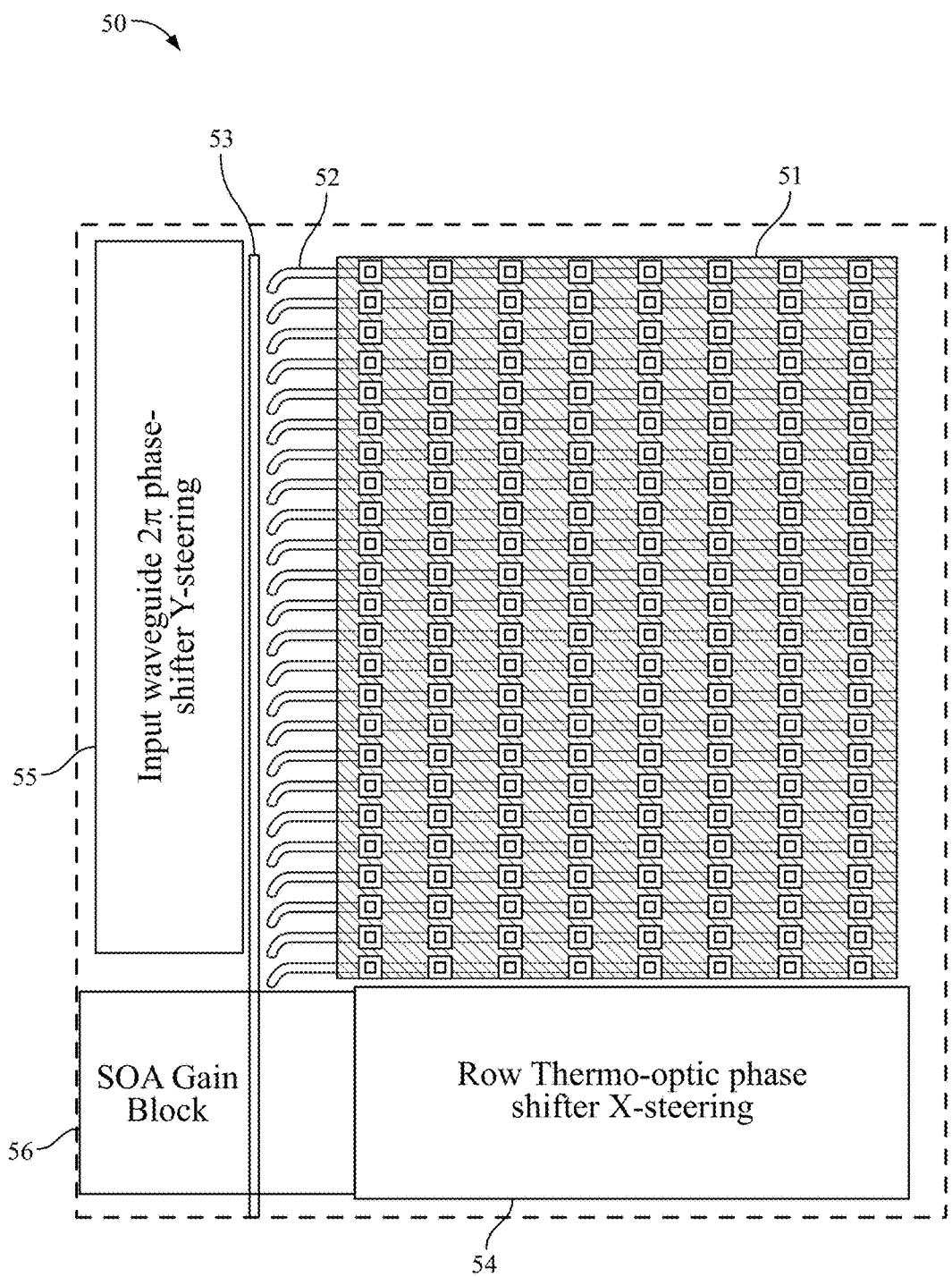
FIG. 5 is a partially schematic plan view of the antenna chip portion of a transceiver module in an example embodiment.

FIG. 5 is a partially schematic plan view of an example antenna chip 50 according to our new design approach. As seen in the figure, the antenna chip includes an array 51 of nanoantenna elements, a plurality 52 of row-wise waveguides, and a feeder waveguide 53. The distribution network that optically couples the feeder waveguide to the row-wise waveguides is not shown in the figure. A waveguiding medium, typically an optical fiber, couples to the feeder waveguide 53 at, e.g., the edge of the chip to provide an incoming and outgoing signal path. In example embodiments, the feeder waveguide is used both to deliver outgoing signals to the nanoantenna array for transmission, and to transport incoming signals from the nanoantenna array toward a detector for reception.

Several overhead features are also shown in the figure. These include the row-wise thermo-optic steering block 54, the column-wise thermo-optic steering block 55, and the optional gain block 56, which typically includes a semiconductor optical amplifier (SOA) coaxial with the feeder waveguide 53.

Although not shown in the figure, a photodetector may be included on the antenna chip. Alternatively, one or more photodetectors may be situated off-chip, with optical input provided by optical fibers or other waveguiding media. The propagation path for incoming optical signals (i.e., the "receive" path) may pass through the gain block, if present. Alternatively, a bypass element such as an optical splitter may be provided so that the receive path does not pass through the gain block. In the event that the receive path does pass through the gain block, the electrical pump power for the SOA may optionally be switched so that there is gain only during transmit periods, whereas the SOA is quiescent during receive periods.

Figure 6:
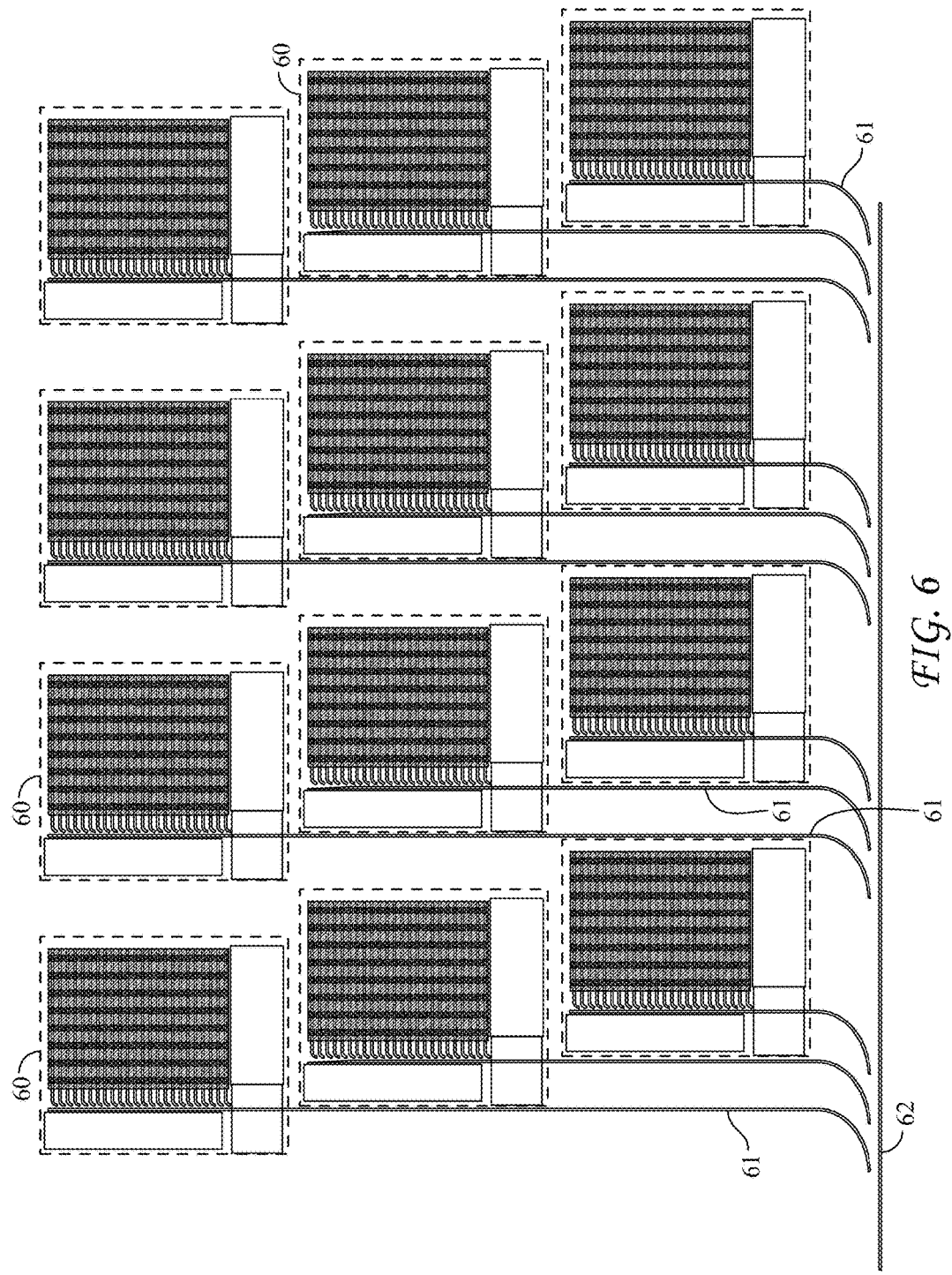
FIG. 6 is a partially schematic plan view of an example transceiver aperture that includes a plurality of sub-aperture modules arranged in an array, according to an embodiment.

FIG. 6 provides a plan view of a full aperture consisting of twelve sub-apertures arranged in an array. The number twelve is chosen only for purposes of illustration and is not limiting. As shown, each of the respective feeder waveguides 61 is extended and optically coupled to a trunk waveguide 62. The extensions of the feeder waveguides will typically be implemented by optical fibers, but other waveguiding media such as planar waveguides may also be useful for this purpose for some applications. Similarly, the trunk waveguide will typically be implemented in optical fiber, but planar waveguides or other waveguiding media may also be useful for some applications.

The trunk waveguide 62 together with directional couplers 62 constitutes an optical distribution network for distributing light from a source (not shown) to each of the sub-aperture tiles. Other kinds of distribution networks are not excluded. For example, a star coupler or the like may be used and could be beneficial for more equally allocating attenuation and delay among the respective tiles.

The same distribution network that is used to distribute the light for transmission can also be used to collect the light for detection by a centralized photodetector. Alternatively, a separate network can be provided for collecting received light. This is discussed in more detail below.

Figure 7:
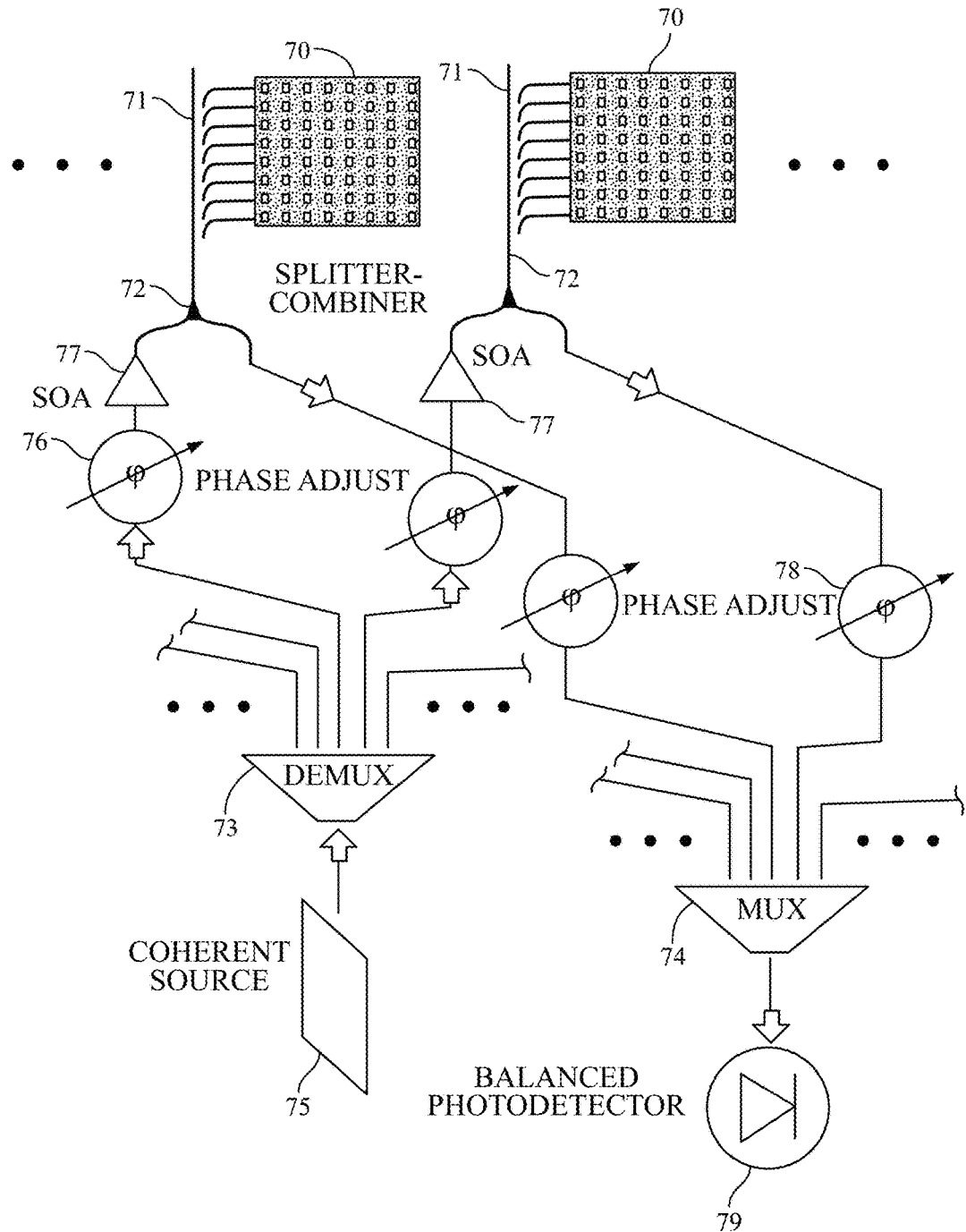
FIG. 7 is a schematic representation of a portion of a transceiver aperture, showing optical distribution networks for optical signals that are outgoing for transmission and that are incoming for detection.

FIG. 7 provides a more detailed view of a portion of a tile arrangement such as the arrangement of FIG. 6. Two example tiles 70 are shown in the figure. Each tile has a feeder waveguide 71 coupled to an optical splitter or circulator 72. One branch of each, e.g., splitter is coupled to a distribution network 73 for transmission, and the other branch is coupled to a distribution network 74 for reception. In the illustrated arrangement, the receive path bypasses the gain block (represented as SOA 77).

A laser 75 serves as a coherent source to feed an input optical beam to the transmission network 73. A branch of the transmission network is dedicated to each respective tile.

Transmission delays need to be compensated because to have a high-quality beam with well-controlled directionality (in either transmission or reception) requires phase variations in the detected light to be limited, to the greatest extent possible, to those due to the phase controls on the nanoantenna elements. In the figure, the delay compensation is made explicit by providing a phase adjuster 76 in the transmit path to each of the tiles and a phase adjuster 78 in the receive path from each of the tiles. In practice, however, these features are optional because the delay-compensation function can be subsumed into the operation of the $2\pi$ phase shifters on each tile.

A phase adjuster 76, if used, can be any of various types of phase modulator elements known in the art.

As shown in the figure, an optical amplifier 77, typically a semiconductor optical amplifier (SOA), provides optical gain in each respective branch of the transmission network. Although the optical amplifier is not critical, it can be advantageous, especially if there is a need to overcome insertion losses and other losses in the network.

The collected received light is directed to a photodetector 79. To take the greatest possible advantage of the scanning and imaging abilities of the transceiver, it is desirable to use coherent photodetection so that both phase and amplitude information can be obtained. A currently preferred photodetector for this purpose is a balanced homodyne or heterodyne detector. Example semiconductor components useful for such a detector are germanium photodiodes. These devices are well-known in the art and need not be described here in detail. In the present context, balanced heterodyne detection may be used to provide an output signal at an intermediate frequency, or balanced homodyne detection may be used to provide an output signal at a baseband frequency.

As noted above, the optical detector may be included on the antenna chip, or, in alternate arrangements, it may be situated off-chip. In example embodiments, an on-chip optical detector includes waveguide-coupled photodiodes that are integrated on the chip. In other example embodiments, discrete photodiodes are optically coupled using waveguiding media such as optical fibers.

One example of a photodiode useful for photodetection in this context is described in Christopher T. DeRose et al., "Ultra compact 45 GHz CMOS compatible Germanium waveguide photodiode with low dark current," *Optics Express* 19, 25 (2011) 24897-24904 (hereinafter, "DeRose 2011"), the entirety of which is hereby incorporated herein by reference. The photodiode described in DeRose 2011 is a CMOS-compatible, vertically illuminated, integrated, waveguide-coupled germanium p-i-n diode with sensitivity in the near infrared.

Another example of a photodiode useful for photodetection in this context is described in Nicholas J. D. Martinez, "High performance waveguide-coupled Ge-on-Si linear mode avalanche photodiodes," *Optics Express* 24, 17 (2016) (hereinafter, "Martinez 2016"), the entirety of which is hereby incorporated herein by reference. The photodiode described in Martinez 2016 is a germanium-on-silicon, integrated, waveguide-coupled avalanche photodiode with near-infrared sensitivity.

Figure 8:
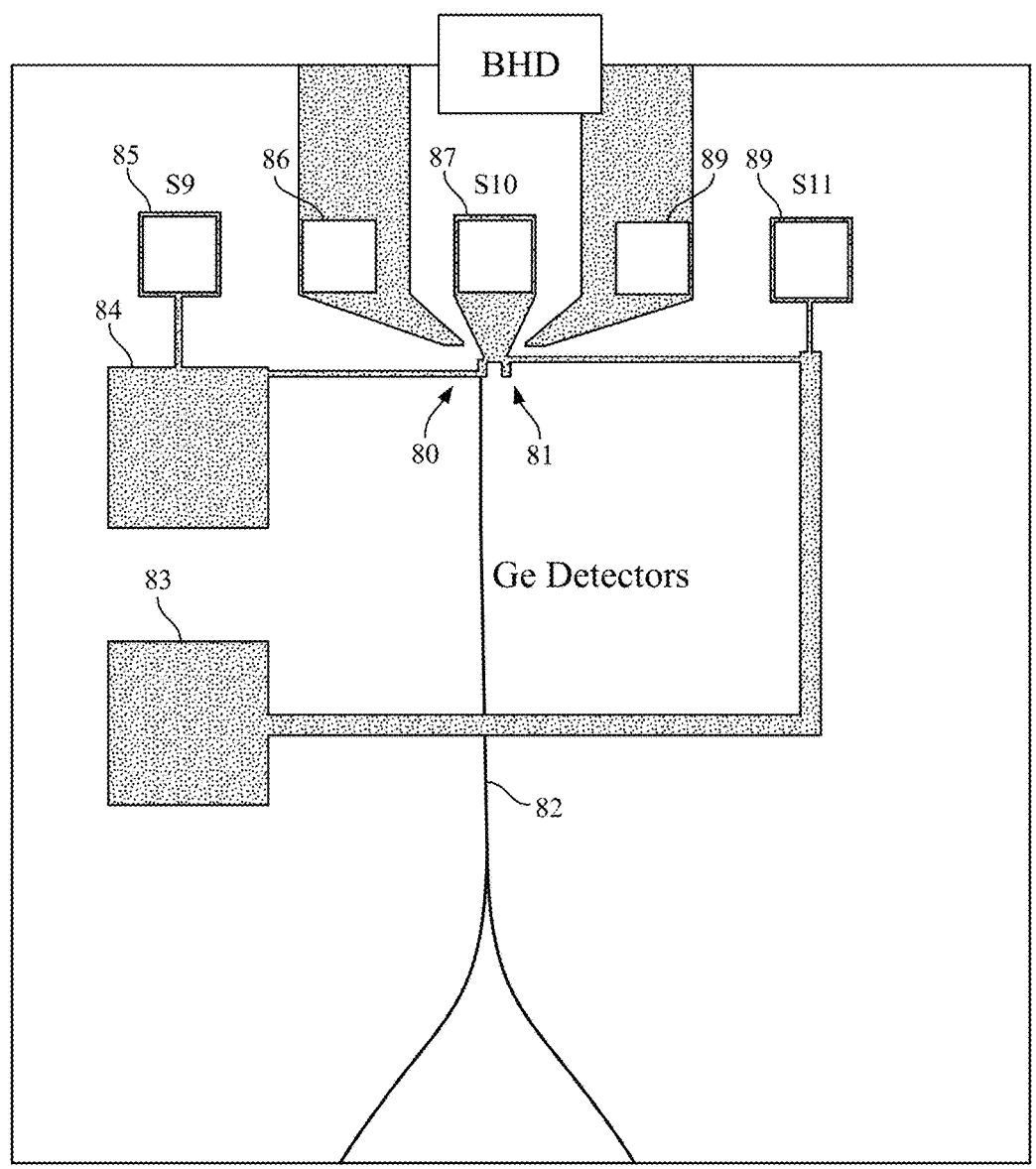
FIG. 8 is a portion of a layout for a transceiver, showing a balanced heterodyne optical detector.

FIG. 8 is a portion of the layout for the antenna chip, showing an example balanced homodyne detector. Two germanium photodiodes 80, 81 are shown in the figure. Each photodiode is connected to a bias voltage terminal and to ground. For balanced homodyne detection, e.g., the two photodiodes are operated in a balanced mixer configuration. A 3-dB optical splitter 82 combines the input signal with a signal from a local oscillator and delivers the combined signal to the photodiodes.

At the photodiodes, local oscillator noise will be in phase, but the beat signal between the input signal and the local oscillator signal will be 180° out of phase at one detector relative to the other. Accordingly, the desired output signal from the balanced homodyne detector is produced by taking the difference between the photocurrent outputs of the respective germanium diodes, which has the effect of canceling at least some of the local oscillator noise.

With reference to the figure, DC bias is provided between ground pads 83, 89 and negative power-supply (−V) level pad 85. The radio-frequency output ($RF_{out}$) signal is provided between radio-frequency ground pads 86, 88 and signal-level $RF_{out}$ pad 87.

The radio-frequency output signal at pad 87 is the difference signal obtained by differencing the photocurrents from the two photodiodes.

As is well known from the theory of diffraction, the main direction of the beam pattern of the nanoantenna array depends on the wavelength of the light used in operation, normalized by the period of the array. Hence the simultaneous use of multiple wavelengths can lead to the formation of multiple coordinated beams. In transmission, a laser emitting at multiple wavelengths can serve as the light source for the transceiver. Alternatively, a composite light source can be realized by combining the outputs from multiple lasers operating at different wavelengths, using any of various known wavelength-multiplexing techniques.

Figure 9:
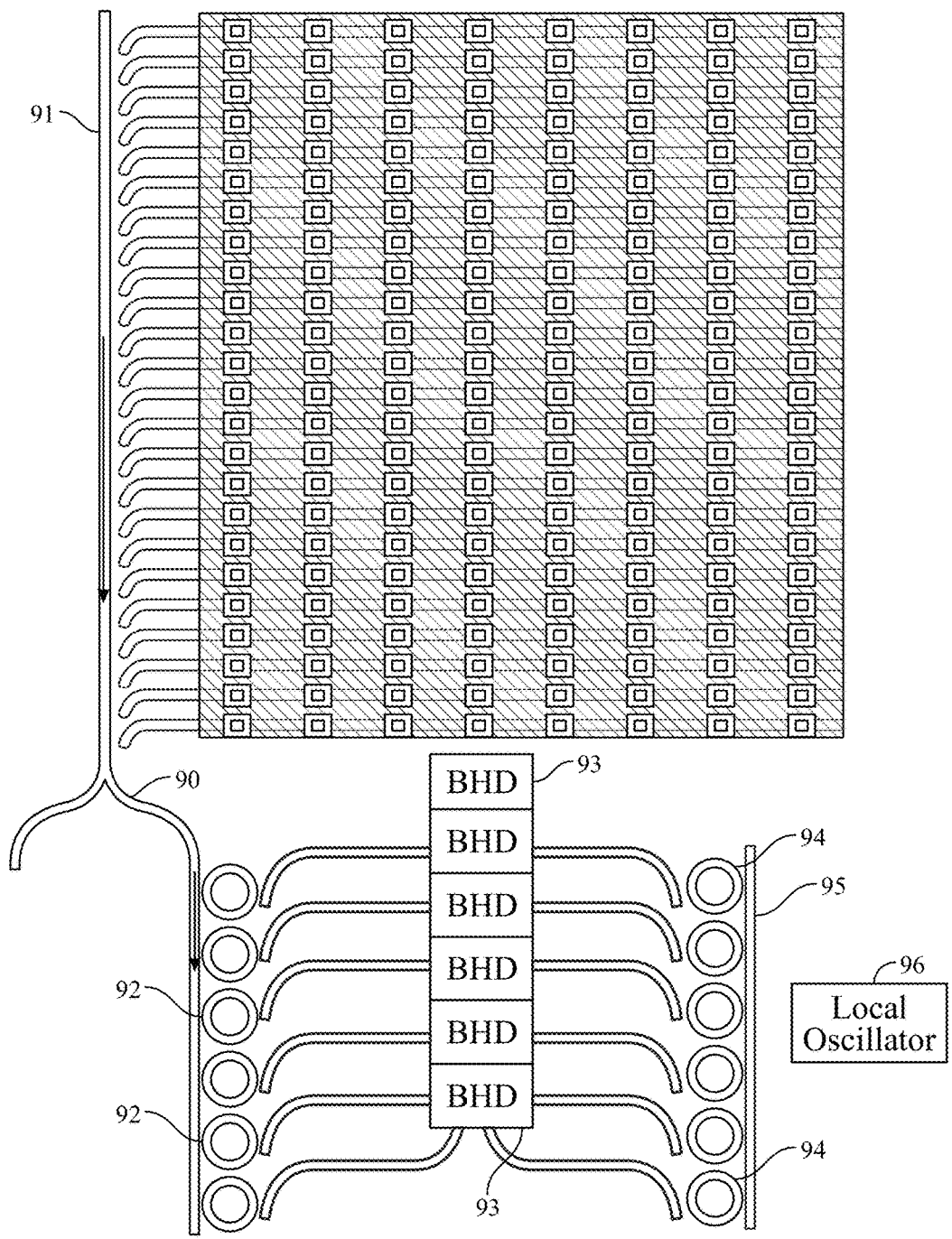
FIG. 9. is a simplified layout diagram of a portion of a transceiver illustrating an example of multiwavelength coupling to a balanced heterodyne detector.

For multi-wavelength reception, it is advantageous to use a composite photodetector that includes a discrete balanced heterodyne or homodyne detector for each respective wavelength in the received signal. FIG. 9 provides an example in which the output branch 90 of feeder waveguide 91 is coupled to each optical filter 92 in an array of filters tuned to discrete wavelengths. Although the filters 92 are represented in the figure as resonant mirroring filters, any of various known types of optical filters can potentially be used.

With further reference to the figure, each filter 92 is optically coupled to a respective balanced heterodyne or homodyne detector (BHD) 93, as represented schematically in the figure. As explained above, a BHD has two inputs, one for the signal and one for a local oscillator signal. As seen in the figure, each BHD 93 is optically coupled to a respective optical filter 94, which acts as a drop filter for a respective wavelength carried on oscillator waveguide 95. A coherent multi-wavelength source, represented schematically in the figure as local oscillator 96, provides a plurality of local oscillator signals on respective wavelengths, which are multiplexed onto waveguide 95.

The composite multi-wavelength photodetector can be included on the antenna chip of an individual module, or it can be situated off-chip on, for example, a centralized platform dedicated for optical signal generation and detection.

In a non-limiting example, sixteen independent source lasers operating at an output power of about 125 mW in the wavelength range 1530-1560 nm are multiplexed to provide the multi-wavelength source signal.

Fabrication

The exemplary processing sequences illustrated here are performed using 248-nm deep ultraviolet lithography (DUV) in a silicon CMOS foundry. Alternative lithographic techniques such as e-beam lithography may be useful, particularly if there is a need to create more finely dimensioned patterns such as more complex nanoantenna element patterns.

We have investigated two possible process flows for fabricating the antenna chip, which we refer to as the "right-side up process" and the "upside-down" process. The main difference between the two processes is that in the right-side up process, all features of the antenna chip are fabricated from the front side of an SOI wafer while the silicon handle wafer is attached. In the upside-down process, by contrast, the metal layer for the nanoantenna array is deposited and patterned after bonding the front side of the SOI wafer to an interposer and removing the silicon handle wafer.

Right-Side Up Process.

Figure 10A:
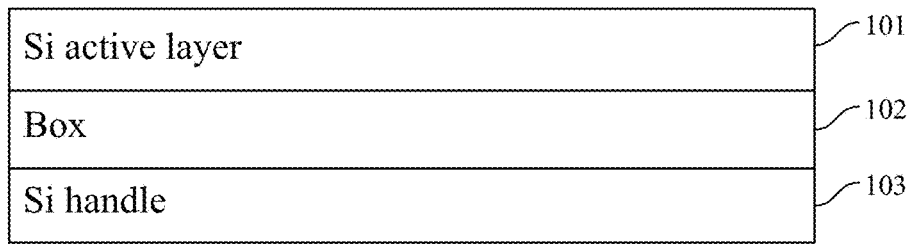
FIGS. 10-13 provide a sequence of views, labeled A-J, illustrating an example process for fabricating a transceiver according to embodiments described herein.
Figure 10B:
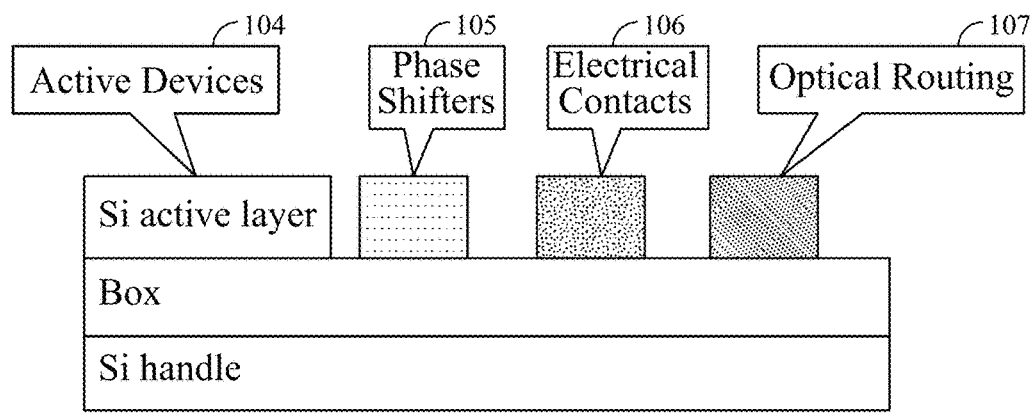
Figure 10C:
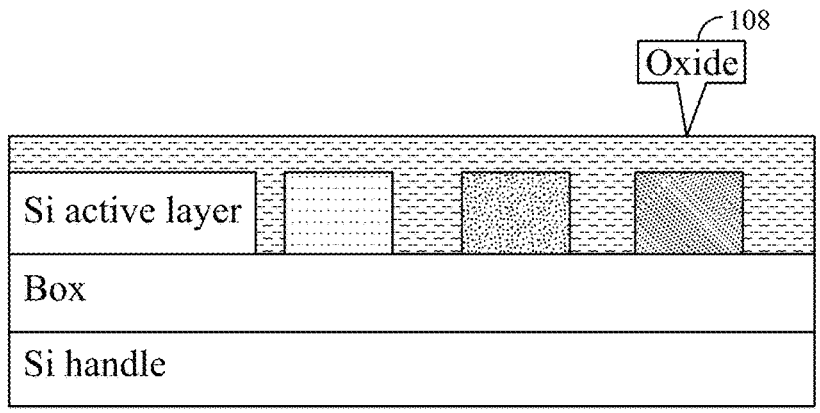

A non-limiting example will be described with reference to FIGS. 10-13. Turning first to FIG. 10, the process is initiated by providing (view A) a starting substrate. The starting substrate is a standard silicon-on-insulator (SOI) wafer having, e.g., a 13 Ω-cm, 250-nm-thick active silicon layer 101, a 3-μm buried oxide (BOX) region 102, and a thick silicon handle 103. In examples, the total wafer thickness is 650 μm.

As indicated at view B of the figure, features which may include active devices 104, phase shifters 105, electrical contacts 106, and optical routing 107 are defined by patterning and etching the active silicon layer and doping selected regions of the active silicon layer by ion implantation. Germanium photodiodes, if they are to be included, can be fabricated at this step. The 2π phase shifters are optionally fabricated at this step, or they can be fabricated in the overlying polysilicon layer to be described below. The optical routing will utilize both the crystalline silicon active layer 101 and the overlying polysilicon layer. It is advantageous to maximize the routing within layer 101 because there is less optical loss in crystalline silicon than in polysilicon.

As indicated at view C of the figure, an oxide layer 108 is then deposited over the active silicon layer and planarized by chemical-mechanical polishing (CMP).

Figure 11A:
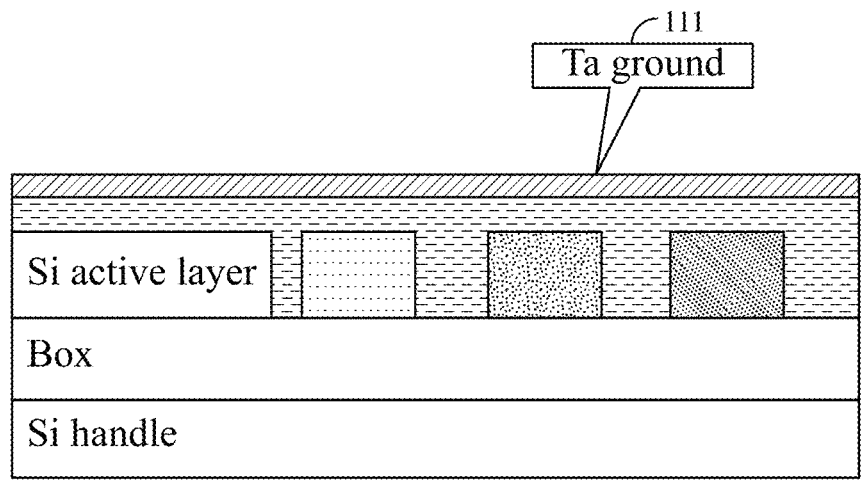
Figure 11B:
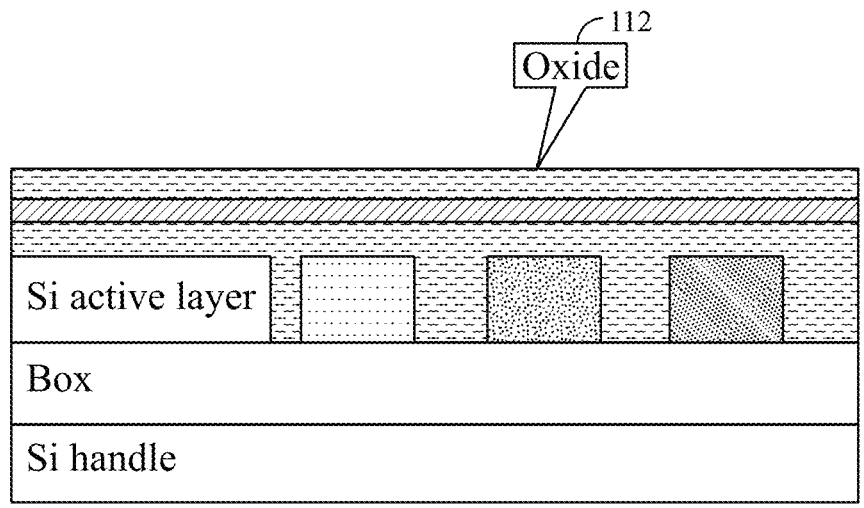

Turning to view D of FIG. 11, a tantalum ground plane 111 is then deposited and patterned. Tantalum is selected because as a refractory metal it is fully compatible with all subsequent thermal processing. Although not critical a metal ground plane is advantageous because it helps to suppress the tendency of the nanoantenna elements to emit equally in the above-plane and below-plane directions. By helping to limit the emission in the below-plane direction, the ground plane improves the efficiency of the antenna. Dividing the optical routing between two optical levels, i.e. the active silicon level and the polysilicon level, helps to accommodate the ground plane within the device structure.

As indicated at view E, a further oxide layer 112 is deposited over the tantalum ground plane and planarized by CMP. The CMP is controlled to provide a desired final thickness for the oxide layer, which provides a standoff between the ground plane and the layer in which the optical routing to the nanoantenna elements takes place.

Figure 12A:
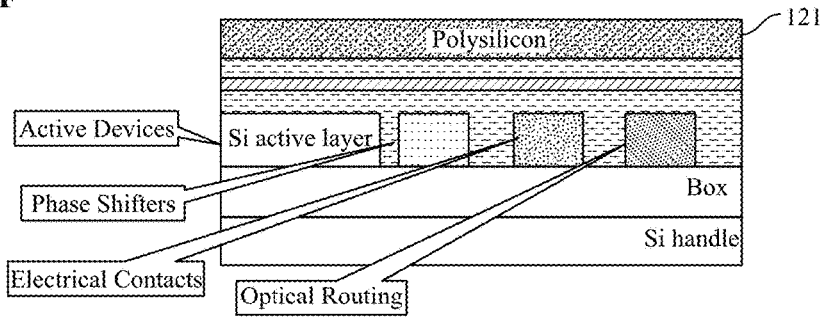
Figure 12B:
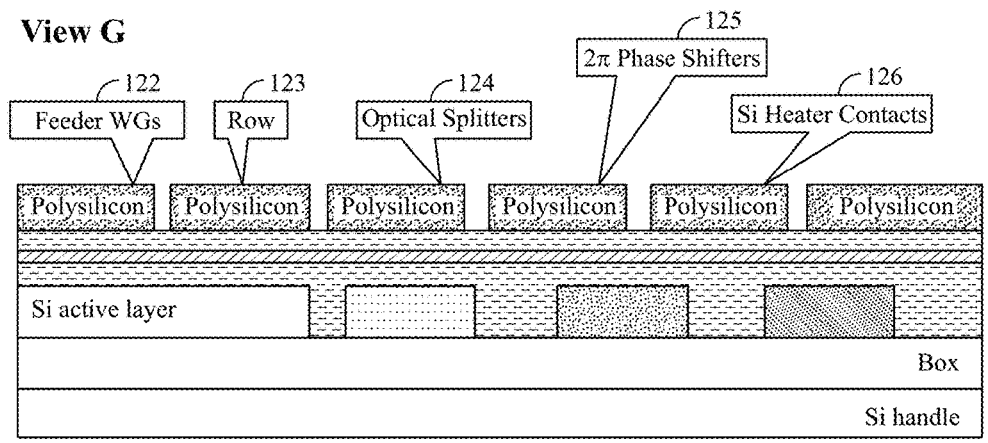
Figure 12C:
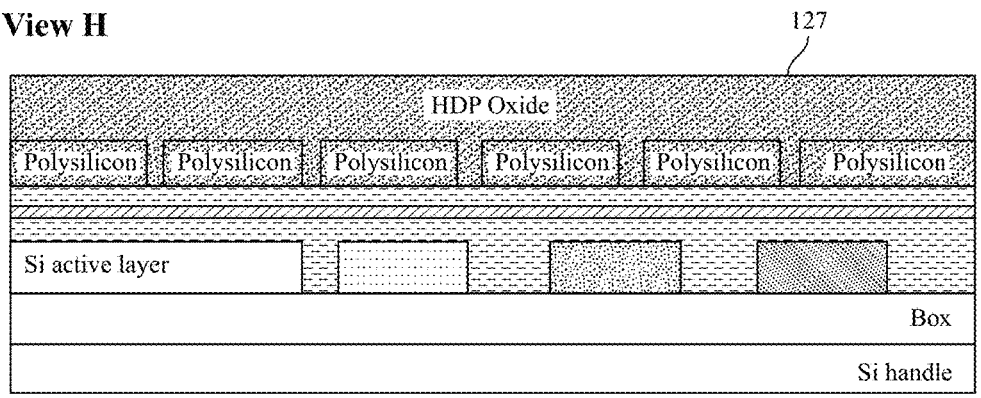

As indicated at view F of FIG. 12, a layer 121 of polysilicon is deposited over the planarized oxide 112. Although it will be assumed below that the deposited material is polysilicon, it should be noted that in other embodiments, the layer 121 can be a layer of silicon nitride.

As indicated at view G, the polysilicon 121 is lithographically patterned and etched by reactive ion etching (RIE) to define waveguiding features including the feeder waveguides 122, the row waveguides 123, and optical splitters 124 and the like. As noted above, the optical routing can be divided between the crystalline silicon layer and the polysilicon layer. As also noted, the 2π phase shifters 125 are optionally also defined in this step. Optically non-perturbing silicon contact members 126 for delivering electric power to the row heaters, as described in the above-cited '086 patent, are also defined in this step.

It was mentioned above that it is useful to interpose thermally blocking elements between the 2π phase shifters and the row waveguides. If the 2π phase shifters are defined in the silicon active layer, then in a device fabricated as described here, the thermal blocking can be inherently provided by the transition between the waveguiding elements in the active silicon layer and the waveguiding elements in the polysilicon (or silicon nitride) layer.

An ion implantation and anneal are then performed to enable designated portions of the row waveguides to function as the row heaters, and to enable such other devices as are defined in the polysilicon layer. The preferred dopant for the resistive heaters is phosphorus, although other possible dopants include arsenic for n-type doping and boron for p-type doping. The doping in the optically non-perturbing contact members is exemplarily at an n+ concentration at the ends distal the row waveguides to promote electrical contact and elsewhere at a carrier density of about $1\text{-}2\times10^{18}$ cm$^{-3}$ or more.

Turning to view H, a high-density plasma (HDP) oxide 127 is then deposited over the polysilicon by chemical vapor deposition (CVD) and planarized by CMP to the thickness desired for a standoff between the polysilicon layer and the overlying metal layer for the nanoantenna elements. An example thickness is 200 nm.

Figure 13A:
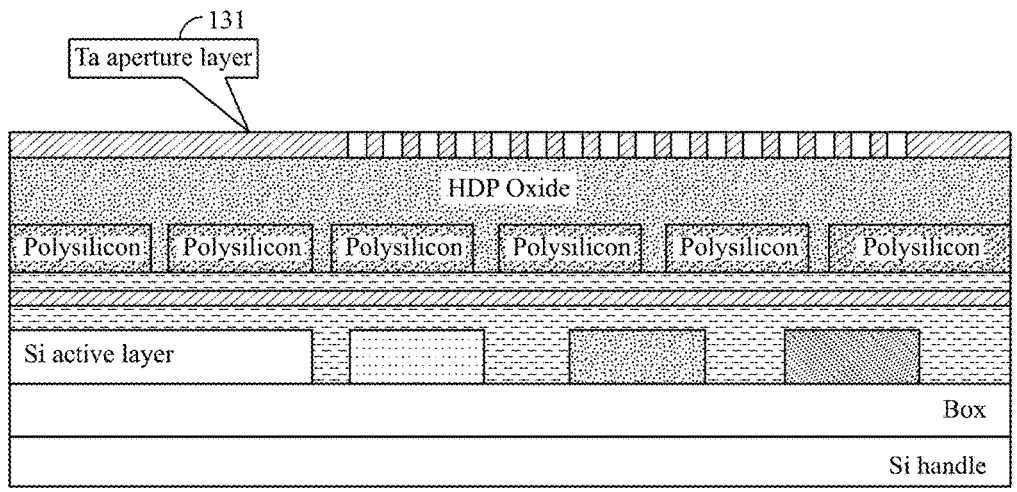
Figure 13B:
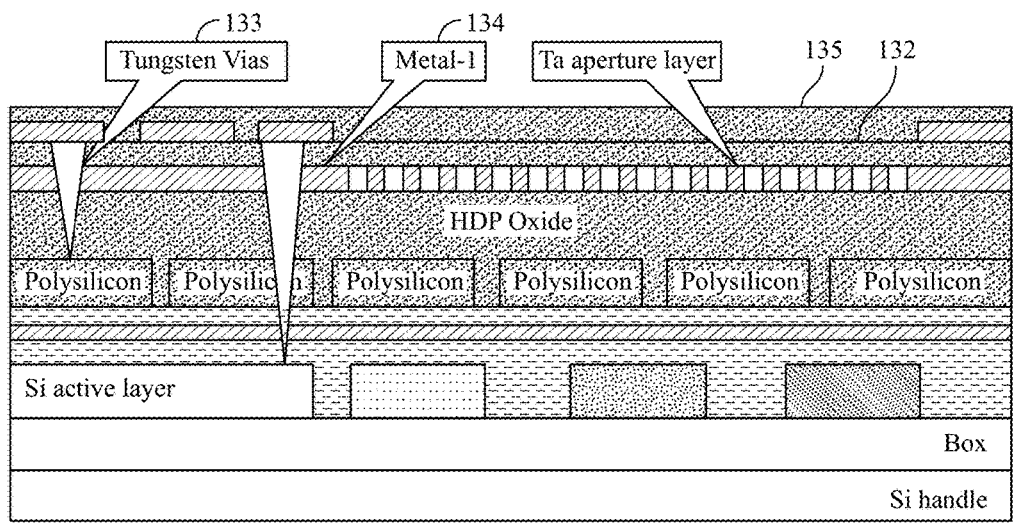

Turning to view I of FIG. 13, a tantalum film 131, in which the nanoantenna array will be defined, is then deposited by sputtering. An example thickness for the tantalum film is 100 nm. The tantalum film deposition is followed with patterning by deep ultraviolet (DUV) lithography and RIE etching. In example designs for an operating wavelength of 1550 nm, the nanoantenna element film is patterned with holes that are 200-300 nm in diameter and arranged with pitches in the range of about 1-4 μm. (In example embodiments, the pitch is 3-4 μm in the propagation direction along the row waveguides, which is the direction of the lower-angle sweep, and the pitch is 1-2 μm in the perpendicular direction, which is the direction of the higher-angle sweep.) If achievable with available lithography, the holes are advantageously sized with a diameter of one-half the operating wavelength, because at this size, it is theoretically possible for a two-dimensional array to achieve a scan range of 2π steradians with no side-lobes in the steered beam.

With reference to view J, a further layer 132 of HDP oxide is deposited over the nanoantenna layer by CVD and planarized by CMP to an example thickness of 800 nm.

Tungsten-filled vias 133 are then conventionally formed down to the polysilicon layer and the active silicon layer, the top-level metallization pattern 134 is added, and a final oxide layer 135 is deposited and opened for contact-pad deposition.

Standard fiber-coupling techniques are used to provide for coupling of an optical fiber to the feeder waveguide.

Upside-Down Process (Non-Standard SOI)

Figure 14A:
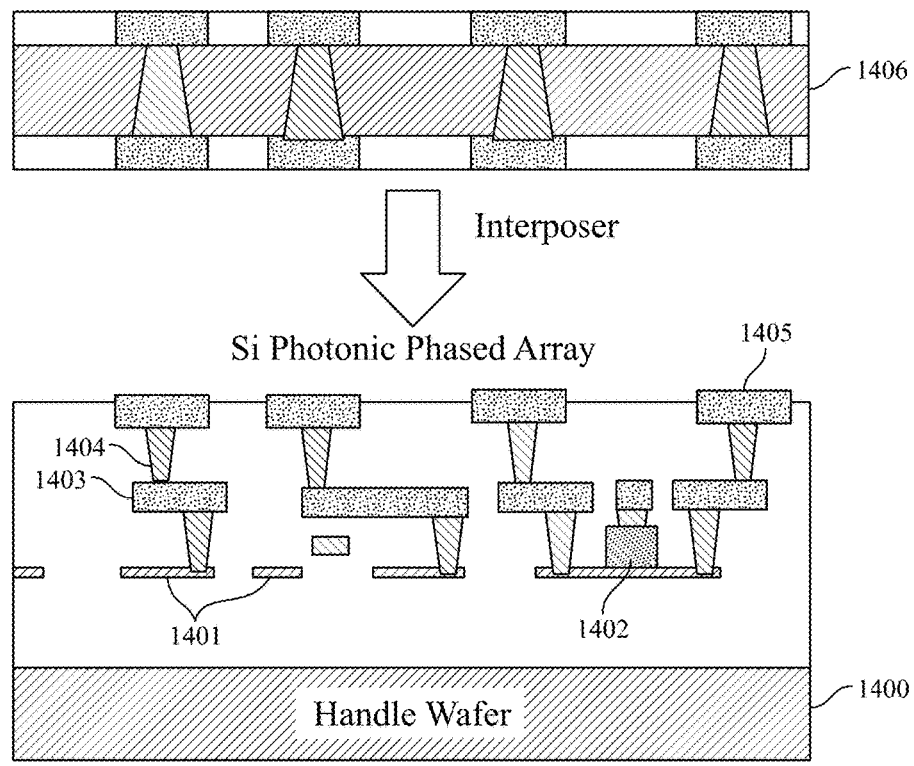
FIGS. 14A-14B and 15A-15B provide a sequence of views illustrating an alternate example process for fabricating a transceiver according to embodiments described herein.
Figure 14B:
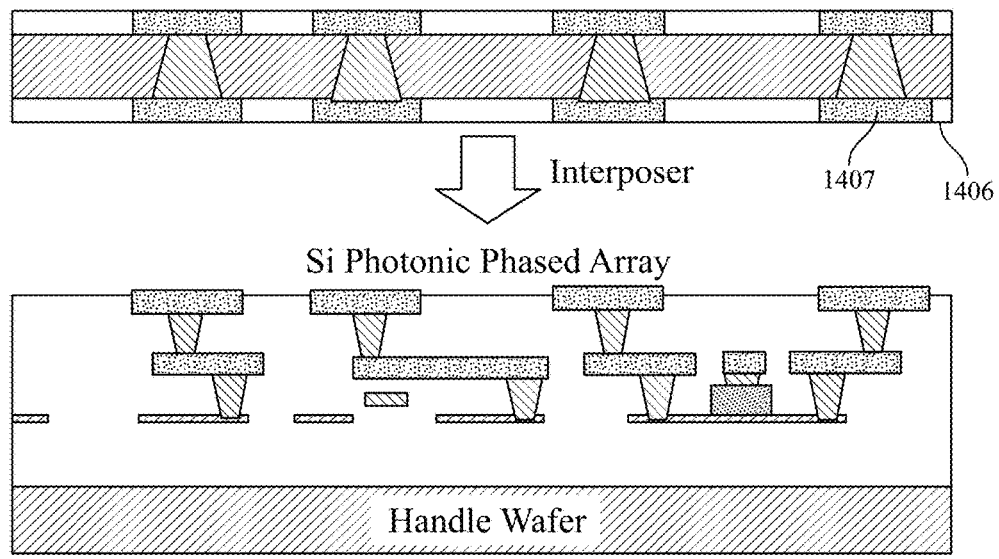

FIG. 14A is a simplified cross section of a representative antenna chip at an intermediate stage of fabrication, and FIG. 14B is a simplified cross section of the same chip after it is bonded to an interposer and after the nanoantenna array has been fabricated. The process sequence described below is most easily understood with reference to FIGS. 14A and 14B and to the elements of those figures that are called out in the description. The cross-sectional view of the workpiece provided in the figures is not to scale and should not be regarded as a realistic depiction of the workpiece. Instead, the figures are meant to be schematic and are provided only for purposes of illustrating the fabrication sequence, for ease of which various simplifications have been made.

In this alternate approach, the fully integrated photonics are fabricated on the antenna chip, including the waveguide buses, the taps or waveguide splitters, the thermo-optical row-wise heaters, and the 2π phase shifters. After fabricating the antenna chip up to the metal contact pads, the antenna chip is flipped onto a TSV interposer chip and bonded. An example interposer is a thinned silicon TSV chip using ALD (atomic layer deposition) alumina to isolate the electroplated metal contacts that connect to the antenna chip. The interposer also acts to mechanically stabilize the antenna chip during the further processing, which includes depositing and patterning the antenna metal to form the nanoantenna element array.

The starting substrate is a specially dimensioned SOI wafer having a silicon handle 1400, an active silicon layer of normal thickness, and a very thin BOX layer, exemplarily 1-3 μm or less in thickness.

The active silicon layer is patterned, etched, and implanted to define the optical routing 1401 and the active devices 1402. A layer of oxide is deposited and planarized by CMP.

According to this approach, the optical routing is implemented at the level of the active silicon layer. However, transitions from the active silicon to waveguides fabricated in polysilicon or silicon nitride are advantageously used to feed the nanoantenna array. These transitions, which are desirably designed for low optical loss, provide thermal isolation from the 2π phase shifters. Accordingly, the polysilicon or silicon nitride waveguides are patterned and etched prior to the oxide deposition.

The tantalum ground plane 1403 is then deposited and overcoated with another oxide layer that is planarized by CMP. Silicon contact regions are formed, tungsten-filled vias 1404 are extended down to the ground plane, and the top-layer metallization 1405 is deposited and patterned. The partially fabricated antenna chip is inverted and bonded to the interposer chip 1406 so that contact pads 1406 in the top-level metallization are mated with contact pads 1407 on the interposer.

Figure 15A:
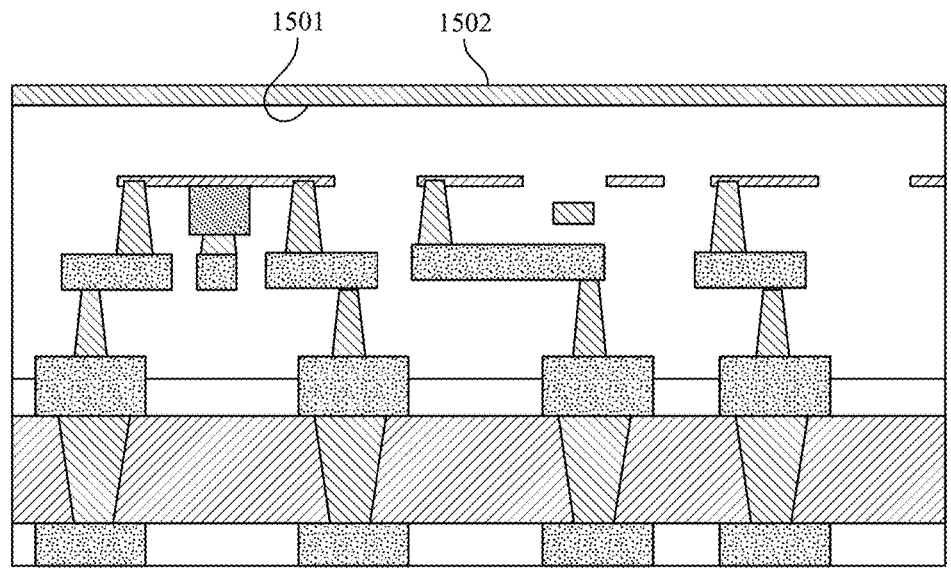
Figure 15B:
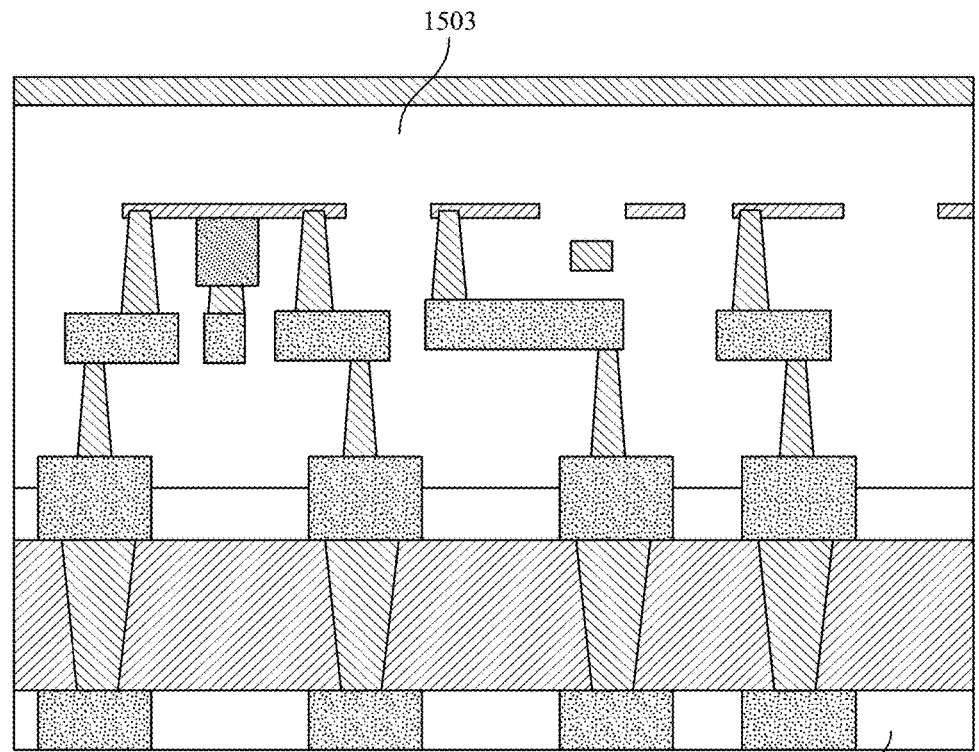

The final steps of the process are best understood with reference to FIGS. 15A-15B. FIGS. 15A-15B are simplified cross-sectional views, similar to the views of the preceding figures, that sequentially illustrate the final assembly according to the steps described below.

The silicon handle on the SOI starting wafer is removed by grinding, thereby exposing the back surface 1501 of the BOX. The back surface of the BOX is then planarized by CMP, which reduces the thickness of the BOX to a desired standoff from the waveguiding layer.

The antenna metal 1502, which may e.g. be gold, aluminum, or tantalum, is deposited as a metal layer on the planarized oxide surface and patterned by deep-ultraviolet or, especially for feature sizes less than 180 nm, by electron-beam lithography. The patterned metal layer is etched with the pattern of holes or other nanoantenna elements to form antenna layer 1503.

The completed antenna chip is then assembled with the control chip 1504 by bonding the distal side of the interposer to the control chip.

Integration of Gain Elements

As noted, semiconductor optical amplifiers (SOAs) can optionally be added to the antenna chip to amplify outgoing radiation that is intended for transmission.

Figure 16:
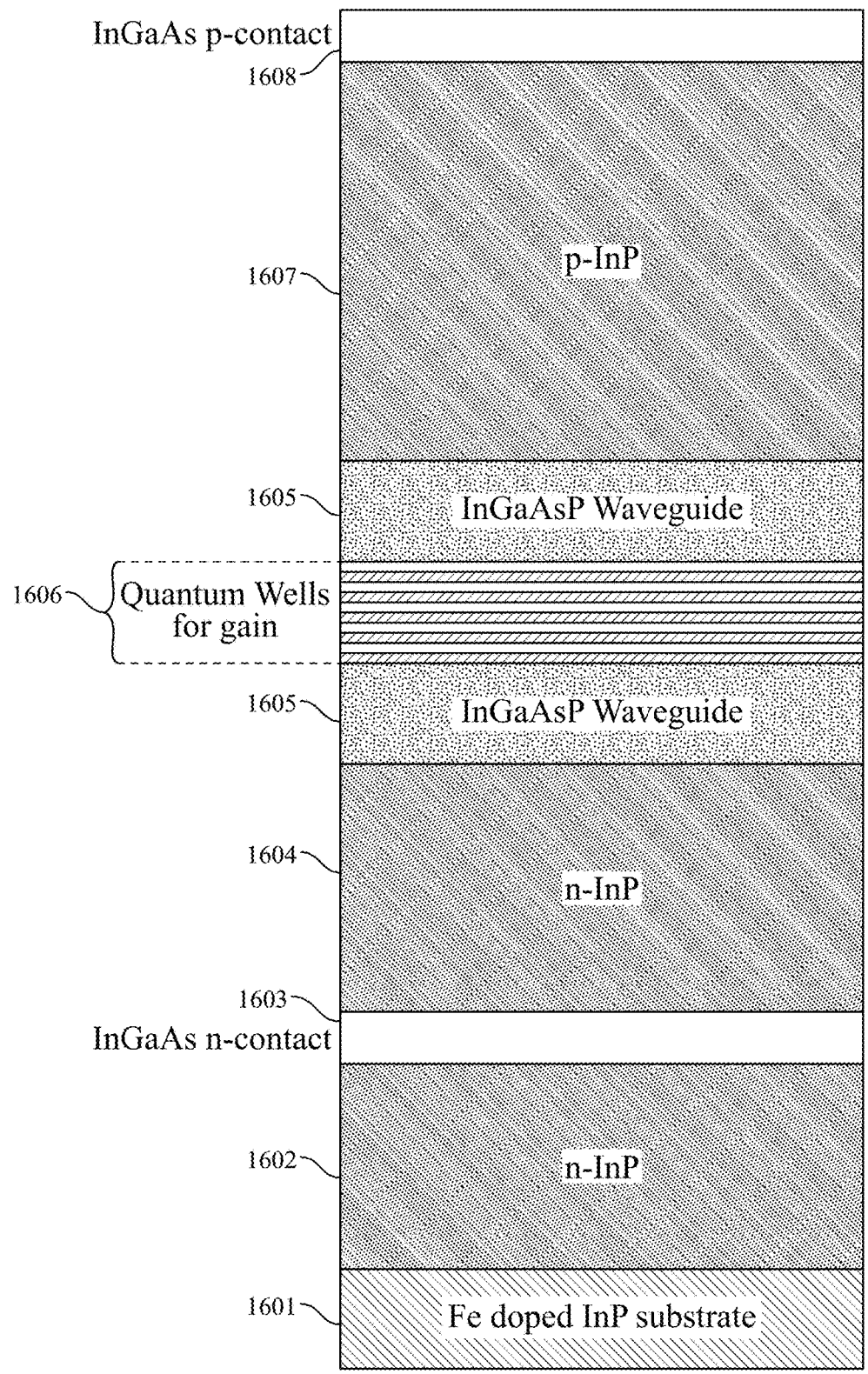
FIG. 16 is a notional cross-sectional diagram of an example semiconductor optical amplifier (SOA) that may be usefully incorporated in a transceiver according to some embodiments described herein.

An example SOA useful in this context can be grown epitaxially on an indium phosphide (InP) wafer which may, e.g., be semi-insulating and n-doped or iron-doped. An example is provided in FIG. 16, where the layers grown sequentially on iron-doped InP substrate 1601 include n-type InP layer 1602 and n-type InGaAs lower contact layer 1603. Next grown is n-type InP lower cladding layer 1604, which forms one side of the diode junction. A waveguide layer 1605 of InGaAsP is then grown. Incorporated within the waveguide layer, as shown, is a gain region consisting of a quantum well multilayer structure 1606. Following the waveguide layer, p-type InP upper cladding layer 1607 is grown, forming the other side of the diode junction. A p-type InGaAs top contact layer 1608 is then grown, and it may be followed by deposition of a metal electrode.

Figure 18:
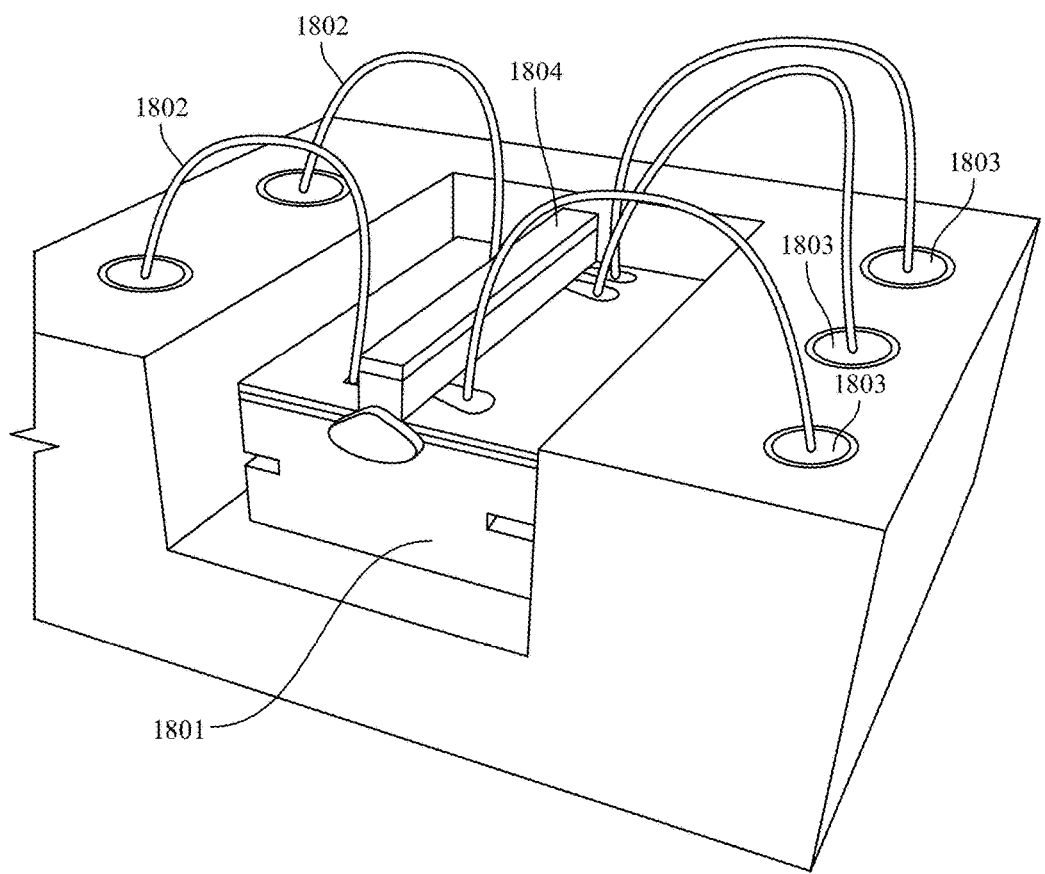
FIG. 18 is a notional perspective view of a detail of the transceiver assembly of FIG. 17, illustrating a wirebonding approach for connecting the SOA.

The top contact layer and the upper cladding layer can be etched to form a ridge (1804; FIG. 18) that extends longitudinally in the propagation direction. The etch can extend through the waveguide layer so that the waveguide layer is also included in the ridge.

The SOA layers are patterned so as to align the waveguide layer directly to the previously patterned silicon waveguide on the antenna chip. In examples, the optical entrance and exit faces of the waveguide layer are overcoated with an index-matching layer of amorphous silicon. To facilitate alignment, the amorphous silicon and the III-V material can be etched using a common masking layer.

The SOAs are provided on the chip in gain sub-blocks that are integrated with the other photonics on the chip.

Figure 17:
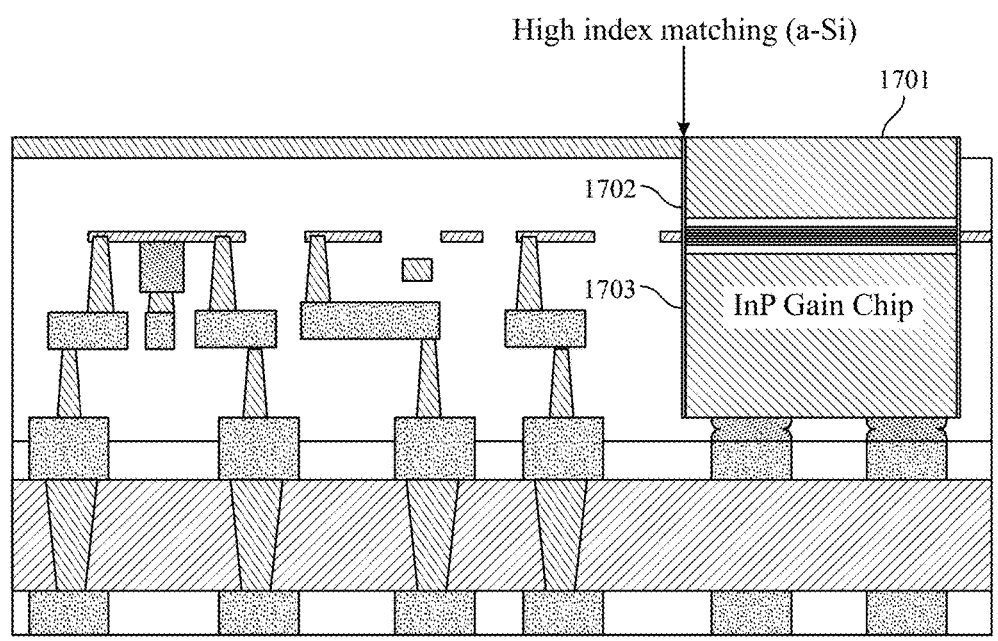
FIG. 17 is a notional cross-sectional diagram of a portion of a transceiver assembly that incorporates an SOA according to some embodiments described herein.

More specifically, as illustrated in FIG. 17, the SOA gain elements 1701 are placed in the silicon waveguide path in an orientation such that the SOA and waveguide propagation axes coincide. This is achieved by etching a well 1702 in the radiative face of the antenna chip through the oxide and waveguide silicon layers and dropping the gain block into the well. This procedure is described in more detail below.

In a "lock and key" approach, socket-and-post alignment marks and metal contacts are provided at the bottom of the well for mating with the SOA. This approach may be desirable if very high precision in placement, i.e. placement to sub-micrometer tolerances, is needed.

In an alternate approach, which is illustrated in FIG. 18, the back of the gain block 1801 (i.e. the side facing out of the well) is wirebonded 1802 to exposed metal surface pads 1803 on the antenna chip near the mouth of the well. This can be done manually using a micromanipulator, or by using a flip-chip bonder. This approach is simpler than the lock and key approach, but it comes at a cost because the wirebond pads use a greater portion of the aperture area.

The wells are etched in the silicon and BOX layers after the antenna chip has been transferred to the interposer wafer and the silicon handle has been removed. The etch terminates at the silicon interposer.

In the wirebond approach, each indium phosphide SOA chip has a pair of topside contacts on which solder bumps are deposited, and the antenna wafer is also prepared with solder bumps. Each SOA chip is thinned to a thickness of about 100 μm. The SOA chip is bonded to the antenna chip using a flip chip bonder such as a Suss Microtech FC150 flip chip bonder. This process can be performed on individual SOA chips. Alternatively, it can be performed on a plurality of chips while they are connected to a common InP substrate that is subsequently removed by a wet chemical etch that stops on the InGaAs etch-stop layer. The device-layer sidewalls are also coated with a protective layer to prevent the substrate etch from attacking them.

Any space between the SOA chip and the antenna chip is then filled with a high-index material 1703 (FIG. 17) such as CVD-deposited amorphous silicon.

What is claimed is:

1. A beam-steering optical transceiver comprising one or more modules, wherein:
    each module comprises an antenna chip and a control chip bonded to the antenna chip;
    each antenna chip comprises an optical feeder waveguide, a plurality of row waveguides that tap off from the feeder waveguide, and a plurality of metallic nanoantenna elements arranged in a two-dimensional array of rows and columns such that each row overlies one of the row waveguides;

each antenna chip further comprises a plurality of independently addressable thermo-optical $2\pi$ phase shifters, each of which is configured to produce a thermo-optical phase shift in a respective row;

each antenna chip further comprises, for each respective row, a row-wise heating circuit configured to produce a respective thermo-optical phase shift at each nanoantenna element along the respective row, each said row-wise heating circuit comprising a single electric heating element for the respective row;

the beam-steering optical transceiver further comprises at least one coherent photodetector optically coupled to the feeder waveguide on at least one antenna chip so that it is in receiving relationship with each of the metallic nanoantenna elements on the at least one antenna chip; and in each module that comprises a given antenna chip and a given control chip, the given control chip includes a controllable current source for each $2\pi$ phase shifter on the given antenna chip, and the given control chip further includes a controllable current source for each row-wise heating circuit on the given antenna chip.

2. The transceiver of claim 1, wherein each module further comprises an interposer, the antenna chip and control chip within each module are each bonded to the interposer so that they are bonded indirectly to each other through the interposer, and the interposer contains a plurality of electrical connections between the antenna chip and the control chip to which the interposer is bonded.

3. The transceiver of claim 1, wherein:
a said coherent photodetector is included on the antenna chip in at least one module;
the control chip for the said module includes a power-supply circuit for the coherent photodetector;
the control chip for the said module further includes a conditioning circuit connected so as to receive an output signal from the coherent photodetector; and
the conditioning circuit is configured to condition the output signal for transmission to a signal processor.

4. The transceiver of claim 3, wherein the coherent photodetector on each antenna chip comprises at least one balanced homodyne or heterodyne detector.

5. The transceiver of claim 4, wherein the coherent photodetector on each antenna chip comprises a plurality of balanced homodyne or heterodyne detectors, each of the balanced detectors comprises a respective local oscillator, and each respective local oscillator is tuned or tunable to provide an optical reference signal at a different wavelength.

6. The transceiver of claim 1, further comprising a light source optically coupled to the feeder waveguide on each of the one or more modules.

7. The transceiver of claim 6, wherein the light source is a multi-wavelength source comprising a multiplexer configured to multiplex optical signals at multiple wavelengths onto the feeder waveguide on each of the one or more modules.

8. The transceiver of claim 1, further comprising a signal processor electrically connected to receive output signals from a respective coherent photodetector on each of the one or more modules and configured to algorithmically combine the output signals from the respective coherent photodetectors.

9. The transceiver of claim 8, wherein the transceiver comprises a plurality of the said modules, and wherein the signal processor is configured to send control signals to all of the modules.

10. The transceiver of claim 1, wherein each antenna chip includes a semiconductor optical amplifier having an optical propagation path that is coaxial with the feeder waveguide.

11. The transceiver of claim 1, wherein each module comprises an interposer having opposing faces, one said face being bonded to an antenna chip and the other said face being bonded to a control chip so that the antenna chip and the control chip are indirectly bonded to each other through the interposer, and wherein, in each module:
the antenna chip has a front side and a back side;
the array of metallic nanoantenna elements is on the front side;
the back side is proximal the interposer;
the antenna chip contains a ground plane situated intermediate the front and back sides;
the antenna chip further comprises vertical interconnects for routing electric power from the interposer through the back side to the row-wise heating circuits and the $2\pi$ phase shifters; and
the antenna chip further comprises vertical interconnects for routing electric power from the interposer through the back side to a coherent photodetector situated on the antenna chip and for routing output signals from the coherent photodetector through the back side to the interposer.

12. The transceiver of claim 1, comprising a compact arrangement of four or more of said modules.

13. The transceiver of claim 1, wherein:
an optical routing arrangement within each given antenna chip comprises the optical feeder waveguide and the row waveguides in the given antenna chip; and
the optical routing arrangement includes waveguiding structures fabricated in a layer of single-crystalline silicon and waveguiding structures fabricated in a layer of polycrystalline silicon that lies between the single-crystalline silicon layer and the array of metallic nanoantenna elements of the given antenna chip.

14. The transceiver of claim 13, wherein the layer of single-crystalline silicon is the active silicon layer of an SOI wafer, and wherein the layer of polycrystalline silicon is a layer deposited onto the SOI wafer.

* * * * *